US012302096B2

(12) United States Patent
Baskaran et al.

(10) Patent No.: US 12,302,096 B2
(45) Date of Patent: May 13, 2025

(54) SECURITY CONTEXT FOR TARGET AMF

(71) Applicant: Lenovo (Singapore) Pte. Ltd., New Tech Park (SG)

(72) Inventors: Sheeba Backia Mary Baskaran, Friedrichsdorf (DE); Andreas Kunz, Ladenburg (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 196 days.

(21) Appl. No.: 18/012,383

(22) PCT Filed: Jun. 26, 2021

(86) PCT No.: PCT/IB2021/055721
§ 371 (c)(1),
(2) Date: Dec. 22, 2022

(87) PCT Pub. No.: WO2021/260661
PCT Pub. Date: Dec. 30, 2021

(65) Prior Publication Data
US 2023/0262453 A1 Aug. 17, 2023

Related U.S. Application Data

(60) Provisional application No. 63/044,981, filed on Jun. 26, 2020.

(51) Int. Cl.
*H04W 12/0433* (2021.01)
*H04L 9/40* (2022.01)
(Continued)

(52) U.S. Cl.
CPC ......... *H04W 12/0433* (2021.01); *H04L 63/20* (2013.01); *H04W 12/06* (2013.01); *H04W 12/10* (2013.01)

(58) Field of Classification Search
CPC . H04W 12/0433; H04W 12/06; H04W 12/10; H04L 63/20
See application file for complete search history.

(56) References Cited

U.S. PATENT DOCUMENTS

2020/0053617 A1\* 2/2020 Park ................. H04W 36/0066
2020/0305118 A1\* 9/2020 Ryu ..................... H04W 76/10
(Continued)

OTHER PUBLICATIONS

ETSI TS 133 501 V15.2.0 (Security architecture and procedures for 5G System (3GPP TS 33.501 version 15.2.0 Release 15), Oct. 2018, 172 pages) (Year: 2018).\*

(Continued)

*Primary Examiner* — Oleg Korsak
(74) *Attorney, Agent, or Firm* — Kunzler Bean & Adamson

(57) ABSTRACT

Apparatuses, methods, and systems are disclosed for security context handling during AMF reallocation. One apparatus in a mobile communication network includes a network interface and a processor that derives a Reroute Security Context and derives a first authentication parameter for authenticating a Target AMF. The network interface receives a Key Request message from a SEAF co-located with the Target AMF following an AMF reallocation during a UE Registration procedure. The processor verifies the Key Request message by determining whether the second authentication parameter matches the first authentication parameter derived for authenticating the Target AMF. The processor derives a new security context for the Target AMF/SEAF in response to successfully verifying the Key Request message. The network interface sends a Key Response message to the Target AMF/SEAF.

18 Claims, 16 Drawing Sheets

(51) Int. Cl.
  *H04W 12/06* (2021.01)
  *H04W 12/10* (2021.01)

(56) References Cited

U.S. PATENT DOCUMENTS

2020/0359440 A1* 11/2020 Qiao .................... H04W 76/15
2021/0385625 A1* 12/2021 Qiao .................... H04W 64/00
2022/0159457 A1* 5/2022 Arkko .................. H04L 9/0841

OTHER PUBLICATIONS

PCT/IB2021/055721, "Notification of Transmittal of the International Search Report and the Written Opinion of the International Searching Authority, or the Declaration", International Searching Authority, Oct. 27, 2021, pp. 1-18.

Ericsson, "Discussion about the AMF re-allocation due to slicing", 3GPP TSG-SA WG3 Meeting #96 S3-192887, Aug. 26-30, 2019, pp. 1-10.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Services and System Aspects; Generic Authentication Architecture (GAA); Generic Bootstrapping Architecture (GBA) (Release 16)", 3GPP TS 33.220 V16.0.0, Sep. 2019, pp. 1-93.

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

Lenovo, Motorola Mobility, "Solution to address KI#1", 3GPP TSG-SA3 Meeting #104-e S3-212946, Aug. 16-27, 2021, pp. 1-5.

* cited by examiner

SECURITY CONTEXT FOR TARGET AMF

CROSS-REFERENCE TO RELATED APPLICATIONS

This application claims priority to U.S. Provisional Patent Application No. 63/044,981 entitled "AMF REALLOCATION BASED UE NAS SECURITY HANDLING IN 5G SYSTEM" and filed on Jun. 26, 2020 for Sheeba Backia Mary Baskaran, Andreas Kunz and Genadi Velev, which application is incorporated herein by reference.

FIELD

The subject matter disclosed herein relates generally to wireless communications and more particularly relates to Access and Mobility Management Function ("AMF") reallocation-based User Equipment ("UE") Non-Access Stratum ("NAS") security handling in Fifth Generation ("5G") Systems.

BACKGROUND

The 5G System ("5GS") supports a registration procedure with AMF reallocation when the initial AMF is unable to serve the UE due to UE's slice subscription information and slice related service requirements. In case of deployments with strict slice isolation, no N14 interface may be supported between initial AMF and target AMF (i.e., reallocated one) based on slice subscription. In the absence of N14 interface, the target AMF will not be able to fetch the NAS security context from the initial AMF to handle the UE's Registration Request.

BRIEF SUMMARY

Disclosed are procedures for primary security context handling (storage and provisioning based on slice security requirements) during AMF reallocation. Said procedures may be implemented by apparatus, systems, methods, or computer program products.

One method of a Common Network Function ("NF") in a mobile communication network includes deriving a Reroute Security Context, the Reroute Security Context containing at least an integrity key for Reroute Non-Access Stratum ("NAS") integrity protection and an encryption key for Reroute NAS ciphering protection and deriving a first authentication parameter for authenticating a Target AMF. The method includes receiving a Key Request message from a Security Anchor Function ("SEAF") co-located with the Target AMF following an AMF reallocation during a UE Registration procedure, where the Key Request message includes at least one of: a UE identifier, Target AMF information, a second authentication parameter and a Reroute Key indication. The method includes verifying the Key Request message by determining whether the second authentication parameter matches the first authentication parameter derived for authenticating the Target AMF. The method includes deriving a new security context for the Target AMF/SEAF in response to successfully verifying the Key Request message, where the new security context is derived from a primary UE security context. The method includes sending a Key Response message to the Target AMF/SEAF, where the Key Response message includes at least one of: the new security context, a Subscription Permanent Identifier ("SUPI") associated with the UE identifier, an Anti-Bidding down Between Architectures ("ABBA") parameter having a special value and a New NAS Security Context Indicator ("N-NSCI").

One method of an initial AMF having a co-located SEAF includes sending a Security Context request message to a common NF during a UE Registration procedure, where the Security Context request message includes at least one of the following: Target AMF Information, a User Subscription Identifier, and a Key Set Identifier ("KSI"). The method includes receiving a Security Context response message from the common NF, where the Security Context response message contains an authentication parameter, and sending a Reroute NAS message with NAS protection to a Radio Access Network ("RAN") node in response to determining to perform AMF reallocation and reroute via RAN, where the Reroute NAS message comprises at least one cleartext Information Element ("IE").

One method of a target AMF having a co-located SEAF includes receiving a Reroute NAS message for a UE, the Reroute NAS message including at least one of: a User Subscription Identifier of a UE, a KSI and an authentication parameter, where an N14 interface with an initial AMF is not supported. The method includes determining to fetch a Reroute NAS Security Context based on the authentication parameter and sending a Key Request message to a common NF, where the Key Request message includes at least one of: the authentication parameter, AMF information, a Reroute Key Indicator, and the KSI. The method includes receiving a Key Response message from the common NF to the Target AMF, where the Key Response message includes at least one of: a SUPI related to the received User Subscription Identifier, a N-NSCI, an ABBA parameter having a special value, a new security context, and a Reroute NAS Security Context containing at least an integrity key for Reroute NAS integrity verification and an encryption key for Reroute NAS de-ciphering, where the new security context is derived from a primary UE security context.

One method of an AUSF includes receiving a UE Authenticate Request message from a common network function during a UE registration procedure. Here, the UE authenticate Request message includes a User Subscriber Identifier and an SNN. The fourth method includes deriving a primary UE security context in response to successful UE authentication, where the primary UE security context includes a first key that is derived from an AUSF Key ("Kausf"). The fourth method includes sending a UE authenticate Response message to the common network function, where the UE authenticate Response message includes an authentication result, a SUPI, and the primary UE security context.

One method of a UE includes receiving a NAS Security mode command message from a Target, where the NAS Security mode command message includes at least one of: a N-NSCI, an ABBA parameter having a special value, and a KSI. The method includes deriving a new SEAF key ("Kseaf") from a primary UE security context in response to the ABBA parameter having the special value and further in response to the N-NSCI. The method includes deriving a new AMF key ("Kamf") from the primary UE security context in response to the N-NSCI. The method includes verifying the NAS Security mode command message using a NAS integrity key derived from the new Kamf and using a NAS ciphering key derived from the new Kamf. The method includes storing the Kamf along with the N-NSCI, the KSI and the ABBA parameter having the special value to local memory in response to successful verification of the NAS Security mode command message. The method includes sending the NAS Security mode complete message to the Target AMF, where the NAS Security mode complete message includes an N-NSCI Acknowledgement.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
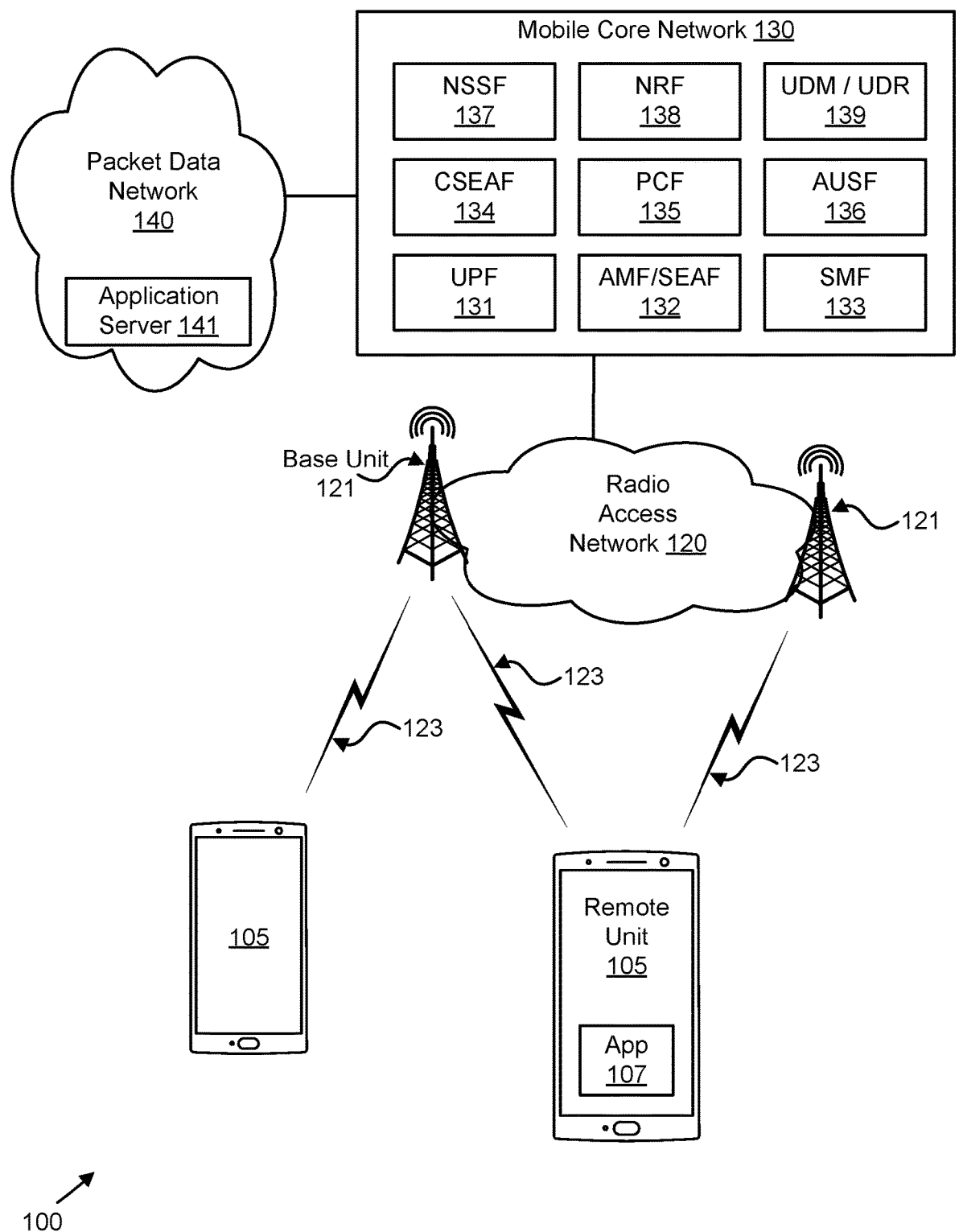
FIG. 1 is a schematic block diagram illustrating one embodiment of a wireless communication system for security context handling during AMF reallocation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of 10 the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a." "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus by which AMF reallocation-based NAS security (due to no N14 interface support between initial AMF and Target AMF in case of strict slice isolation requirements) can be handled in the 5GS. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In Third-Generation Partnership Project ("3GPP"), the 5G System ("5GS") supports a registration procedure with AMF reallocation when the initial AMF is unable to serve the UE, e.g., due to UE's slice subscription information and slice related service requirements. However, in case of deployments with strict slice isolation, the initial AMF and target AMF may be in different security domains, such that no N14 interface may be supported between Initial AMF and Target AMF. Note that strict slice isolation may be implemented for vertical service requirements to prevent one slice from interacting with other slices. The strict slice isolation also prevents NAS security contexts from being shared between network slices.

In the absence of N14 interface, the Initial AMF sends the UE's registration message to the Target AMF via the RAN using a reroute procedure. However, current reroute procedure does not allow the Target AMF to fetch the security context (e.g., NAS security context) from the Initial AMF to handle the UE's Registration Request. This inability to fetch the security context retrieval impacts the two following scenarios.

Scenario 1—Initial Registration procedure: During initial registration, without improved security context handling, the Target AMF would be unable to handle the received rerouted NAS message (i.e., Initial UE message or Registration Request) because the rerouted NAS message would not contain any NAS security context (as it is routed via RAN) and the Target AMF also will not have access to the UE's security context nor subscription profile due to lack of connectivity to the Initial AMF (i.e., a source AMF). Thus, AMF reallocation without N14 interface would fail in Scenario 1 (i.e., will lead to Registration failure).

Scenario 2—Mobility Registration Update: Once the UE is registered and established security with Source AMF (e.g., the Initial AMF), on UE's mobility to a different area, the UE sends the Registration Request of type 'mobility registration update' to the Target AMF, where the Target AMF—in the absence of N14 interface-would be unable to fetch the UE security context (e.g., NAS security context) from the Source AMF (e.g., Initial AMF). Accordingly, the Target AMF would be unable to process the received 'Registration Request' message which is both integrity and confidentiality protected. The Target AMF performs primary authentication (and NAS security set up with UE) and based on local policy and subscription, if it determines to perform AMF reallocation and reroute via RAN and if it sends the Registration Request/initial UE message to the new Target AMF via RAN, then, AMF reallocation without N14 interface would fail in Scenario 2.

As defined in 3GPP TS 33.501, Clause 6.46, "Protection of Initial NAS message" the initial NAS message is the first NAS message that is sent after the UE transitions from the idle state. Here, the UE is to send a limited set of IEs (called the cleartext IEs) including those needed to establish security in the initial message when it has no NAS security context.

However, the UE has a NAS security context, the UE shall send a message that has the complete initial NAS message ciphered in a NAS Container along with the cleartext IEs with whole message integrity protected. The complete initial message is included in the NAS Security Mode Complete message in a NAS Container when needed (e.g., AMF cannot find the used security context) in the latter case and always in the former case. In certain embodiments, the cleartext IEs, includes subscription identifiers (e.g., SUCI or GUTIs), UE security capabilities, New Generation Key Set Identifier ("ngKSI"), indication that the UE is moving from EPC, Additional GUTI, and IE containing the TAU Request in the case idle mobility from LTE."

Therefore, unless the target AMF (i.e., Reallocated AMF) has access to the UE security context, the target AMF cannot handle the Registration Request in either case described. So far, there is no security solution available in the SA3 technical specification (3GPP TS) or technical report (TR) for the UE NAS security context transfer to Target AMF to support scenarios (i) AMF reallocation during registration and (ii) registration mobility update, in the absence of N14 interface.

To remedy the above mentioned problems with UE security context handling during AMF reallocation, the present disclosure describes a common network function ("NF") in the 5G core network ("5GC") that performs new security functionality by controlling security context provisioning while adhering to slice security and service requirements (e.g., strict isolation between different slices and/or security domains). In certain embodiments, the common network function is embodied in a new network function which can be referred to as any one of the following: a Common Security Anchor Function ("CSEAF"), Security Management Function ("SEMF") or Security Control Function ("SECF"). In other embodiments, the common network function may be implemented by an existing network function that performs new security functionality. Examples of suitable existing NFs include, but are not limited to, an Authentication Server Function ("AUSF"), a Network Slice Selection Function ("NSSF"), a Network Repository Function ("NRF"), or another well-connected NF.

In various embodiments, the common NF (e.g., AUSF, CSEAF, etc.) may be slice agnostic. As used herein, "slice agnostic" refers to the security context being designed to be compatible with different network slices. In certain embodiments, the common NF is located in the serving network. Alternatively, based on the deployment scenario, a common NF may also be located at the home network. This new security functionality may be needed in case the Target AMF does not belong to the same AMF set of the Source AMF (e.g., Initial AMF).

In the absence of N14 interface between the AMFs (Initial/Source AMF and Target AMF) due to strict slice isolation requirements, the Common NF acts as the UE security context storage and control function managing the security context at the serving network which is provided by the home network after a successful authentication. The Common NF governs slice security requirements and facilitates (e.g., slice specific) Anchor Key (e.g., Kseaf) sharing among SEAFs and/or NAS security context sharing among AMFs when required during the registration procedure (e.g., Initial Registration procedure or Mobility Registration Update procedure) and AMF reallocation procedure as described in greater detail below.

FIG. 1 depicts a wireless communication system 100 for security context handling during AMF reallocation, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 130 are depicted in FIG. 1, one of skill in the art will recognize that any number of remote units 105, base units 121, wireless communication links 123, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non- 3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, access terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 141 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 141 in the packet data network 140 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 140. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5Q1").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as NodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a Fifth-Generation Core network ("5GC") or an Evolved Packet Core network ("EPC"), which may be coupled to a packet data network 140, like the Internet and private data networks, among other data networks. A remote unit 105 may have a subscription or other account with the mobile core network 130. In various embodiments, each mobile core network 130 belongs to a single mobile network operator ("MNO"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 132 that serves the 5G-RAN 115, a Session Management Function ("SMF") 133, a Policy Control Function ("PCF") 135, an Authentication Server Function ("AUSF") 136, a Network Slice Selection Function ("NSSF") 137, a Network Repository Function ("NRF") 138, a Unified Data Management function ("UDM") and a User Data Repository ("UDR"). The depicted mobile core network includes a Common Security Anchor Function ("CSEAF") 134; however, in other embodiments the CSEAF is omitted as a discrete NF and its security functionality implemented by another NF in the mobile core network 140, such as the AUSF 136, the NSSF 137, or the NRF 138

The UPF(s) 141 is/are responsible for packet routing and forwarding, packet inspection, QoS handling, and external PDU session for interconnecting Data Network ("DN"), in the 5G architecture. The AMF 132 is responsible for termination of Non-Access Stratum ("NAS") signaling, NAS ciphering & integrity protection, registration management, connection management, mobility management, access authentication and authorization, security context management. While FIG. 1 shows a single AMF 132, in other embodiments the mobile core network 130 may include multiple AMFs 132. The SMF 133 is responsible for session management (i.e., session establishment, modification, release), remote unit (i.e., UE) Internet Protocol ("IP") address allocation & management, DL data notification, and traffic steering configuration of the UPF 131 for proper traffic routing.

The PCF 135 is responsible for unified policy framework, providing policy rules to CP functions, access subscription information for policy decisions in UDR. The AUSF 136 acts as an authentication server and allows the AMF 132 to authenticate the remote unit 105.

The NSSF 137 is responsible for selecting of the Network Slice instances to serve the remote unit 105, for determining the allowed network slice selection assistance information ("NSSAI"), and for determining the set of AMF(s) 132 to be used to serve the remote unit 105. Here, "NSSAI" refers to a vector value including one or more S-NSSAI values. The NRF 138 provides NF service registration and discovery, enabling NFs to identify appropriate services in one another and communicate with each other over Application Programming Interfaces ("APIs").

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include a Network Exposure Function ("NEF") (which is responsible for making network data and resources easily accessible to customers and network partners), an Application Function ("AF") (which supports application influence on traffic routing, accessing NEF, interaction with policy framework for policy control, or other NFs defined for the 5GC. In certain embodiments, the mobile core network 130 may include an authentication, authorization, and accounting ("AAA") server.

In various embodiments, the each of the mobile core network 130 supports different types of mobile data connections and different types of network slices, wherein each mobile data connection utilizes a specific network slice. Here, a "network slice" refers to a portion of a core network optimized for a certain traffic type or communication service. A network slice instance may be identified by a single-network slice selection assistance information ("S-NSSAI") while a set of network slices for which the remote unit 105 is authorized to use may be identified by NSSAI. In certain embodiments, the various network slices may include separate instances of network functions, such as the SMF 133 and UPF 131. In some embodiments, the different network slices may share some common network functions, such as the AMF 132. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, in an LTE variant where the mobile core network 130 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 132 may be mapped to an MME, the SMF 133 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments for security context handling during AMF reallocation apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. The term UE is used for the user equipment, but it is replaceable by any other radio access node, e.g., mobile terminal ("MT"), access terminal ("AT"), WTRU, IAB node, etc. Further, the operations are described mainly in the context of 5G NR. However, the described solutions/methods are also equally applicable to other mobile communication systems security context handling during AMF reallocation.

Figure 2:
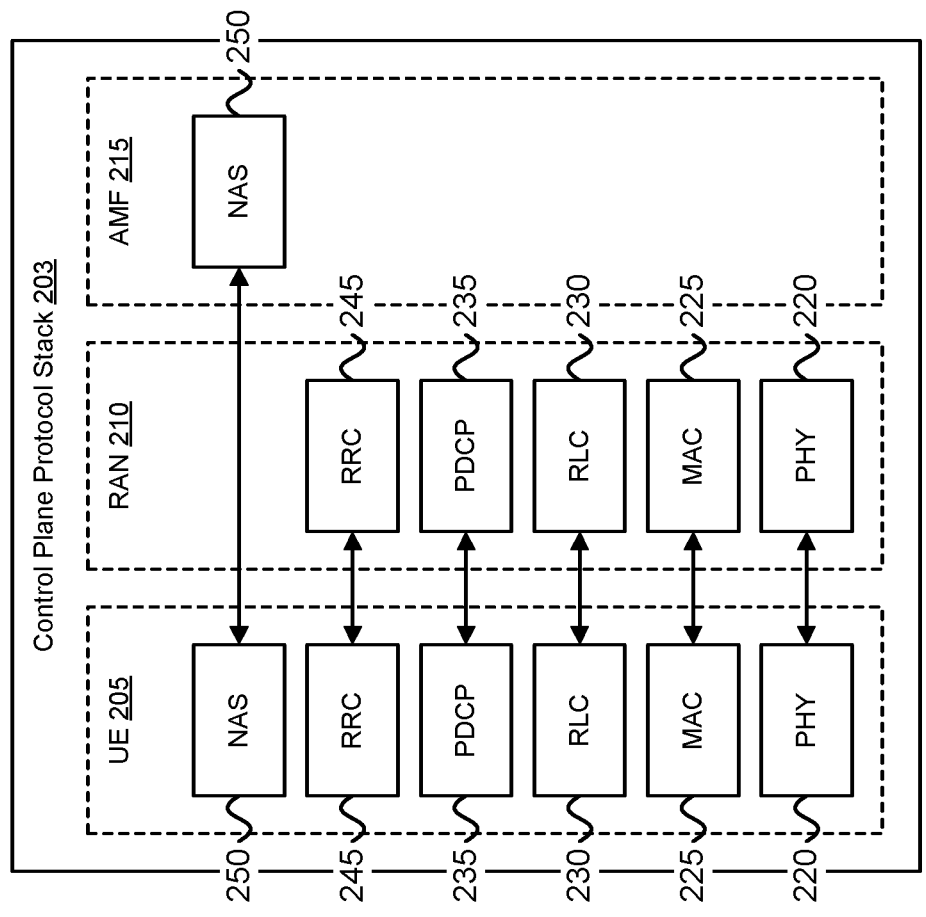
FIG. 2 is a block diagram illustrating one embodiment of a Fifth-Generation ("5G") New Radio ("NR") protocol stack.
Figure 2:
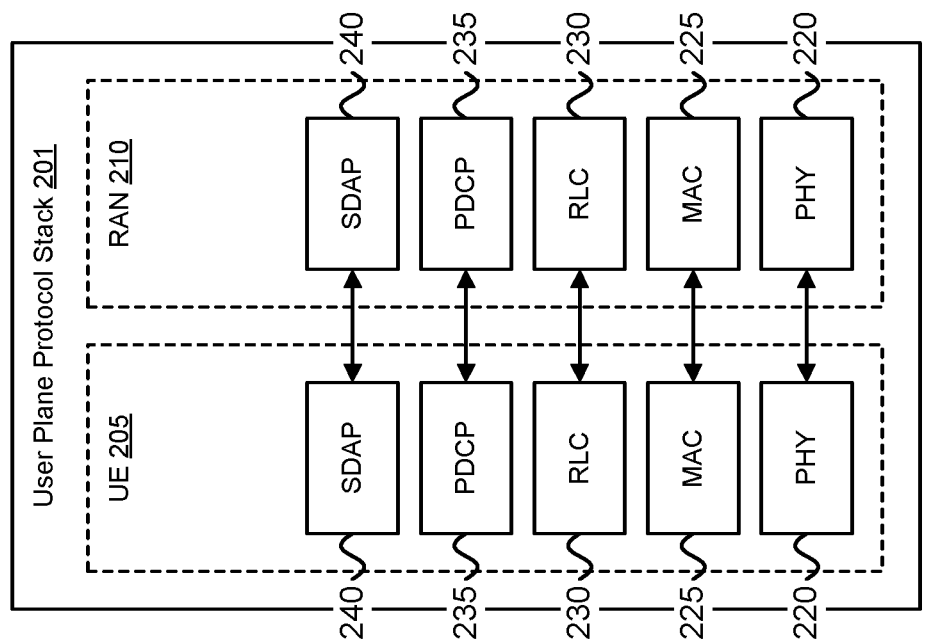

FIG. 2 depicts a NR protocol stack 200, according to embodiments of the disclosure. While FIG. 2 shows the UE 205, the RAN 210 and an AMF 215 in a 5G core network ("5GC"), these are representative of a set of remote units 105 interacting with a base unit 121 and a mobile core network 130. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform Clear Channel Assessment ("CCA") and/or Listen Before Talk ("LBT") procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the AMF 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN 210 (i.e., a RAN node, such as gNB) and carries information over the wireless portion of the network.

When the initial AMF 215 is unable to serve the UE 205, the NAS message received from the UE 205 is rerouted to another target AMF 215 either directly over the AMF-to-AMF interface (i.e., N14) or via RAN 210. Current 3GPP specification only define reroute via RAN during initial registration. Once the UE has registered and established security with the network, only afterwards the direct reroute is possible. The reason for this is that the current security mechanisms specified in 3GPP TS 33.501 rely heavily on the assumption that AMFs can communicate directly.

The dependency on this assumption goes to the extent that the security specifications prohibit the UE 205 from accepting unprotected messages from the core once security has been established. Therefore, while a registered UE 205 is moving from an area to the other, it is assumed that the Target AMF 215 is always able to retrieve the security context from an old AMF (i.e., Source AMF 215) that used to serve the UE 205. In case a reroute via RAN 210 takes place, and the Target AMF 215 is unable to retrieve the UE security context, then the Target AMF 215 is not able to trigger a new authentication procedure in order to establish a new security context. In fact, the Target AMF 215 would not be able to communicate with the UE 205 in the first place since all the unprotected downlink messages will be dismissed by the UE 205.

To enable deployment scenarios with stricter slice isolation requirements on the core network, for example where the AMFs 215 are unable to communicate with each other, the network supports the indirect reroute procedure for registration of UEs 205.

Therefore, for deployments that require strict slice isolation, no N14 interface may be supported and so direct reroute and retrieval of UE NAS security context is not possible using conventional mechanisms. In case of RAN rerouting to support slice isolation, the NAS message alone is rerouted and the UE NAS security context cannot be rerouted via RAN from the Initial AMF to Target AMF considering the security of NAS security context.

To support both strict slice isolation and AMF reallocation, the Common NF (i.e., AUSF, CSEAF, etc.) acts as the UE security context storage and control function managing the security context at the serving network which is provided by the home network after a successful authentication. The Common NF controls the security context provision to other NFs such as AMFs, co-located SEAFs, etc. by ensuring the network slice security requirements such as slice security isolation and slice service data privacy).

According to embodiments of the first solution, a Target AMF is enabled to receive the UE security context (e.g., NAS security context or security anchor key (i.e., SEAF Key)) from the Common NF (i.e., AUSF, CSEAF, etc.). The first solution applies to the scenario where the UE performs initial registration to a 5GS through an AMF (known as Initial AMF) and gets successfully registered. The same UE, as it moves to a different area, sends a Registration Request of type, 'Mobility Registration Update,' to the new Target AMF. Here, the Initial AMF may be referred to as "Source AMF."

According to the first solution, updates to the existing 5G system include the following:

A well-connected NF handles primary security context storage and provisioning (e.g., based on slice security requirements). The well-connected NF may also be referred to as the "Common NF." As discussed above, the Common NF may be a new network function, such as a Common SEAF, a SEMF, a SECF, and/or a Standalone SEAF. Alternatively, the Common NF may be implemented by an existing 5GC NF, such as the AUSF, the NSSF, the NRF, etc.

The Common NF is used to store a high-level (i.e., primary) UE security context in the serving network (or home network) which controls the provisioning of service based/slice security isolation-based UE security context (e.g., Kseaf/Kamf) to the slice specific core network functions (SEAF, AMF, etc.). As used herein, the notation "Kx/Ky" refers to alternative security key, where the key 'Kx' may be replaced with 'Ky', depending on implementation. For example, "Kcseaf/Kausf" has the meaning "Kcseaf or Kausf" where the specific key (Kcseaf or Kausf) depends on the implementation (e.g., whether a CSEAF is deployed). Similarly, the notation "Kx/Ky/Kz" refers to alternative security key, where the key 'Kx' may be replaced with 'Ky' or with the key 'Kz,' depending on implementation.

Updates to the Initial Authentication procedure steps involved during the registration procedure required to support UE Registration Request handling by the Target AMF in the absence of N14 interface are described below with reference to FIGS. 3A-3B. Updates to the Registration procedure of type 'Mobility Registration Update' required to support UE Registration Request handling by the Target AMF in the absence of N14 interface are described below with reference to FIGS. 4A-4B.

The Common NF provides the UE-related network security context provisioning service to the requester NF, e.g., using service-based architecture and interface. Where a CSEAF is deployed, the Common NF may provide the UE-related network security context provisioning service to the requester NF using the "Ncseaf_SecurityContext_Get" service operation, defined as follows:

Service operation name: Ncseaf_SecurityContext_Get

Description: Validates the NF requester (AMF/SEAF) provided UE information (SUCI and SUPI pairing and ngKSI) and provides the UE security context to the NF requester.

Inputs:
Required: SUCI, KeyRequestIndicator
Optional: ngKSI

Outputs:
Required: Kamf/Kseaf, new ABBA parameter (for slice specific security feature), ngKSI, N-NSCI, SUPI
Optional: None Note that where the Common NF is implemented using the AUSF, the AUSF may provide the UE-related network security context provisioning service to the requester NF using a "Nausf_SecurityContext_Get" service operation, defined as follows:

Service operation name: Nausf_SecurityContext_Get

Description: Validates the NF requester (AMF/SEAF) provided UE information (SUCI and SUPI pairing and ngKSI) and provides the UE security context to the NF requester.

Inputs:
Required: SUCI, KeyRequestIndicator
Optional: ngKSI

Outputs:
Required: Kamf/Kseaf, new ABBA parameter (for slice specific security feature), ngKSI, N-NSCI, SUPI
Optional: None Additional 5GS updates include Providing New NAS Security Context Indicator (N-NSCI) by the Common NF (i.e., AUSF, CSEAF, etc.) to AMF and in turn AMF to UE to indicate the UE to derive a NAS security context (Kamf) from Kseaf, Kausf or Kcseaf and to rekey the Kamf accordingly.

Additional 5GS updates include the Common NF (i.e., AUSF, CSEAF, etc.) providing a new ABBA parameter specific to the slice-based security feature to enable the AMF and UE to generate a NAS security context adhering to the slice isolation security requirements.

Where a CSEAF is deployed, note that the CSEAF may be referred to as a standalone SEAF, when the deployment has AMFs with no co-located SEAF. However, if an AMF has a co-located SEAF, e.g., as in current deployments for 3GPP Release 16 and Release 17, then the new SEAF for primary security context handling (i.e., storage and provisioning based on slice security requirements) is referred to as the Common SEAF ("CSEAF").

The reference point between the AMF and the CSEAF (alternatively, SEMF, SECF, and/or Standalone SEAF) can be defined as 'Nx' and the reference between the CSEAF (alternatively, SEMF, SECF, and/or Standalone SEAF) and AUSF can be defined as 'Ny,' where the 'x' and 'y' in 'Nx' and 'Ny' can take any numerical number based on the availability as handled by the 3GPP Service Architecture group.

Figure 3A:
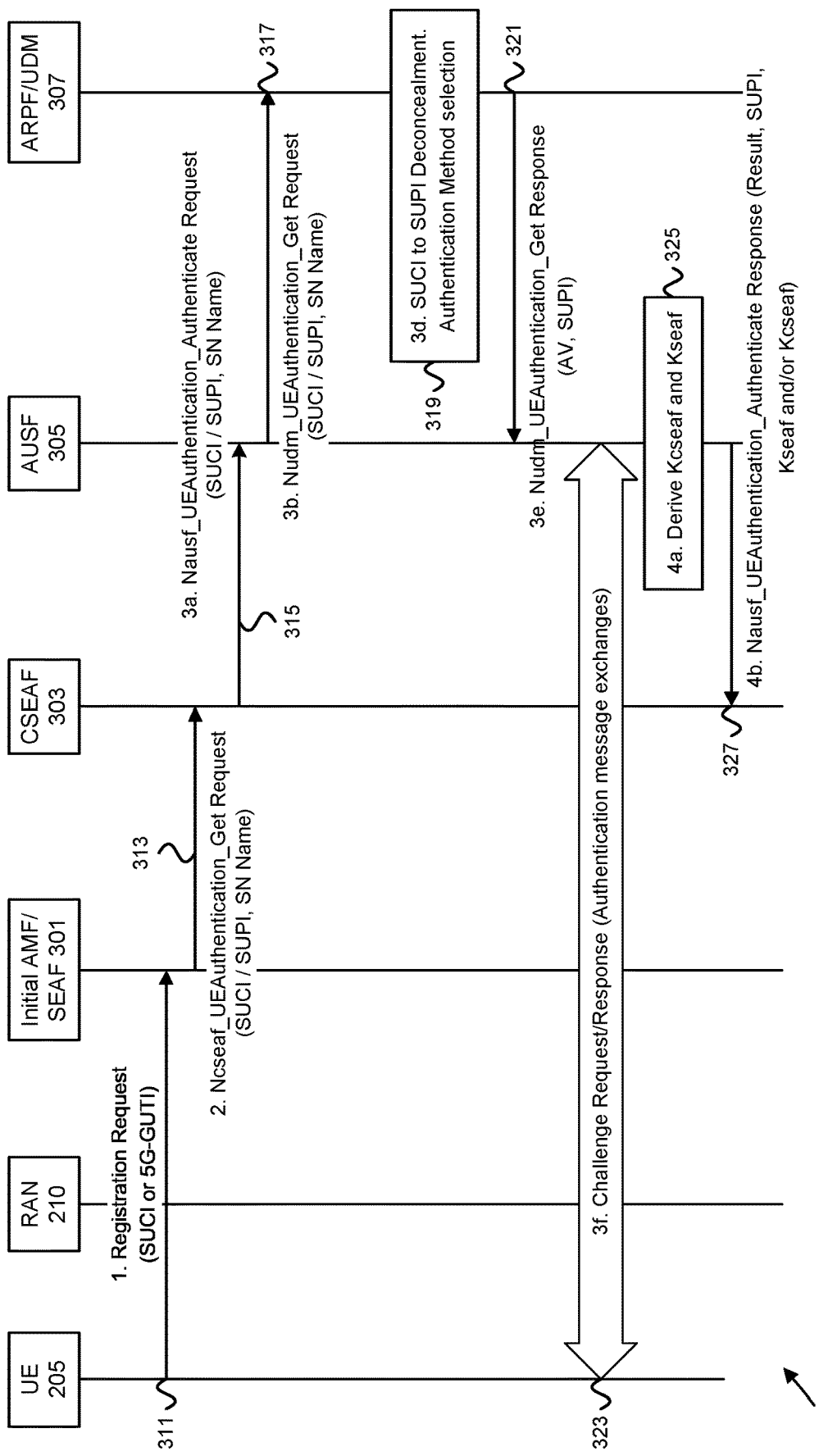
FIG. 3A depicts a signal flow diagram illustrating one embodiment of initial registration procedure and provisioning of UE primary security context.
Figure 3B:
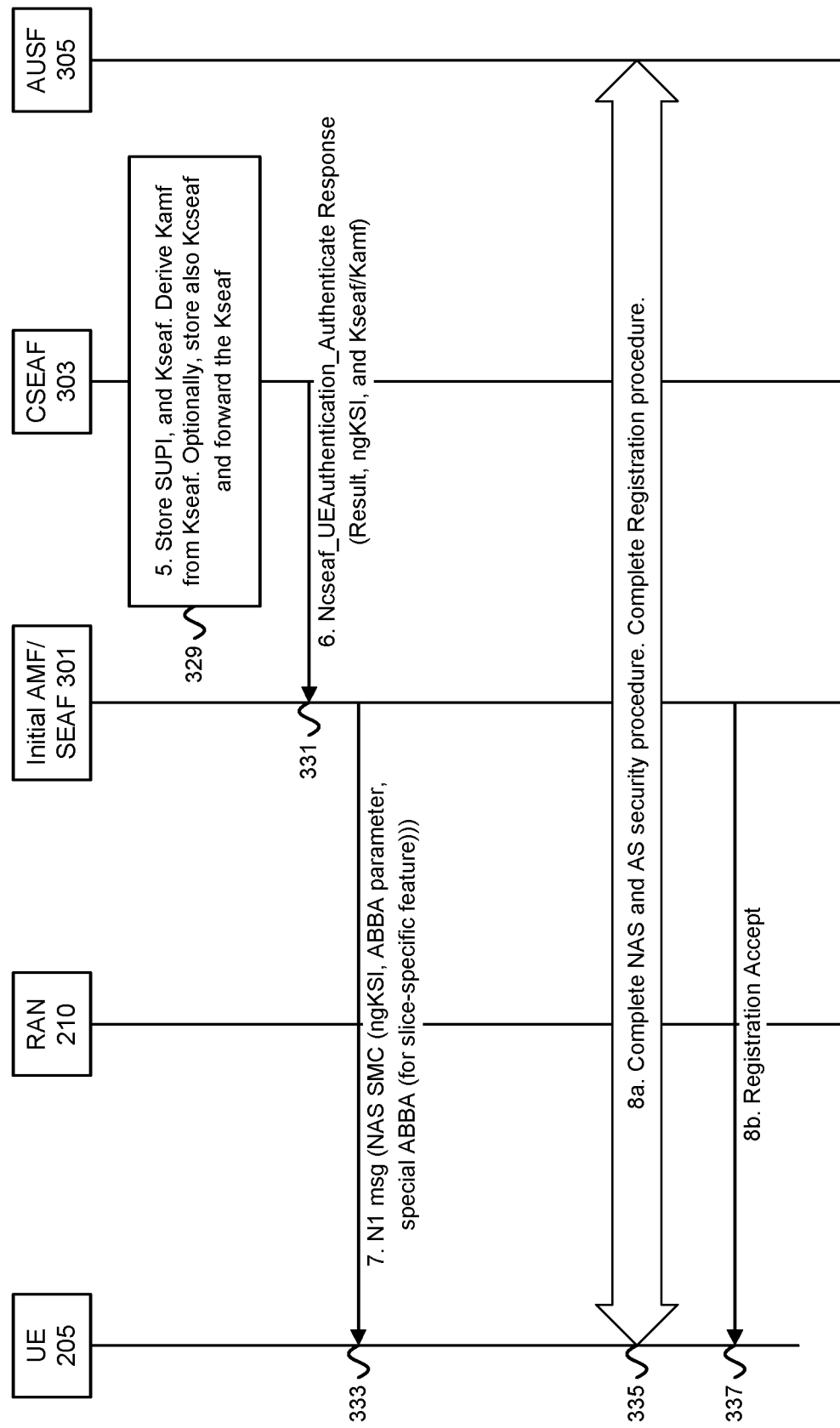
FIG. 3B is a continuation of the signal flow diagram of FIG. 3A.

FIGS. 3A-3B depicts signaling flow of a procedure 300 for initial registration procedure and provisioning of UE primary security context to a CSEAF, according to the first solution for NAS security handling for AMF reallocation. The procedure 300 involves the UE 205, the RAN 210, an Initial AMF with co-located SEAF (depicted as combined entity "Initial AMF/SEAF" 301), the CSEAF 303, the AUSF 305 and an Authentication credential Repository and Processing Function ("ARPF") co-located with UDM (depicted as combined entity "ARPF/UDM" 307). As used herein, the notation "AMF/SEAF" refers to an AMF having a co-located SEAF.

At Step 1, the UE 205 sends the Registration Request with SUCI or 5G-GUTI to the initial AMF (i.e., initial AMF/SEAF 301: see messaging 311).

Currently the 5G system (Rel. 15 and 16) has the SEAF co-located with the AMF. But this SEAF is considered as the security anchor function which holds the anchor key (Kseaf) provided by the home network to the serving network after a successful UE primary authentication. All the NAS and AS security keys are derived from this anchor key (Kseaf). So, having such network function SEAF to be co-located with AMF will heavily impact the UE security context sharing if no N14 interface is supported between AMFs due to slice isolation requirements. Therefore, the first solution considers two options here for the NF to manage UE security context:

According to Option 1, a Standalone SEAF is deployed to serve multiple AMFs, i.e., there may not be co-located SEAFs in the AMFs. Here, every functionality of SEAF can be similar to the Rel. 15 and 16 features but in addition Standalone SEAF supports the proposed features specified in this disclosure.

According to Option 2, a Common SEAF (also known as SECF/SEMF) is deployed in addition to the co-located SEAFs in the AMFs in order to manage storage and provisioning of the UE security contexts to other NFs such as AMF, SEAF (co-located with AMF), etc. by considering the slice based security requirements.

Note that in the embodiment of FIGS. 3A-3B, the network deploys the CSEAF 303 in additional to the co-located SEAF in the AMFs. However, in the following descriptions the CSEAF 303 is representative of both options, i.e., the Standalone SEAF and the Common SEAF. Similarly, the Initial AMF/SEAF 301 depicted if FIGS. 3A-3B is representative of both a standalone AMF (i.e., Option 1) and a co-located AMF/SEAF (i.e., Option 2).

At Step 2, the initial AMF (if Option 1) or the co-located SEAF (Option 2 where the SEAF receives the Registration Request from AMF) initiates the authentication based on its local policy and triggers the authentication request by sending the new service operation message Ncseaf_UEAuthentication_Authenticate Request containing SUCI/SUPI and the serving network name (SNN/SN Name) to the CSEAF 303 (see messaging 313). The CSEAF 303 locally stores the SUCI.

At Step 3a, the CSEAF 303 invokes the authentication by verifying the SNN and forwarding the received authentication request from the initial AMF/SEAF 301 to the AUSF 305 in the Nausf_UEAuthentication_Authenticate Request message.

At Step 3b, upon receiving the Nausf_UEAuthentication_Authenticate Request message, the AUSF 305 checks that the requesting CSEAF 303 in the serving network is entitled to use the serving network name in the Nausf_UEAuthentication_Authenticate Request by comparing the serving network name with the expected serving network name.

After successful verification, the AUSF 305 sends the Nudm_UEAuthentication_Get Request to the ARPF/UDM 307 with SUCI/SUPI and SNN.

At Step 3d, upon reception of the Nudm_UEAuthentication_Get Request, the ARPF/UDM 307 invokes a Subscription Identifier De-concealing Function ("SIDF") if a SUCI is received. The SIDF then de-conceals the SUCI to gain SUPI before the ARPF/UDM 307 can process the request. Further the ARPF/UDM 307 selects the authentication method (ex. EAP-AKA' or 5G AKA or any method) to be used to perform mutual authentication between the UE 205 and the 5G system, for example as described in 3GPP TS 33.501 Clause 6.1.2.

At Step 3e, the ARPF/UDM 307 generates an Authentication Vector ("AV") based on the authentication method selected (example, EAP-AKA' AV or 5G Home Environment AV) and provide the AV along with SUPI and selected authentication method indication to the AUSF 305 in Nudm_ UEAuthentication_Get Response message.

At Step 3f, based on the authentication method selected for the primary authentication, the AUSF 305 and the UE 205 exchange method-specific authentication request/response messages, e.g., as described in 3GPP TS 33.501 clause 6.1.3, until a successful authentication is determined at the AUSF 305.

At Step 4a, after a successful authentication, the AUSF 305 derives the AUSF Key (Kausf) based on authentication method, e.g., according to 3GPP TS 33.501. The AUSF 305 further derives the Anchor Key (Kseaf) from the Kausf. Note for Option 2, if the AUSF 305 receives the authentication request from the CSEAF 303 in step 3a, then the AUSF 305 additionally derives the CSEAF Key (Kcseaf) from Kausf. In certain embodiments, the derivation of Kcseaf and Kseaf from Kausf is as follows:

$$Kcseaf=KDF(Kausf,FC,SNN,\text{length of SNN},SUPI,\\ \text{length of SUPI},\text{Usage Type}=\text{'Serving Network}\\ \text{Master Key,'Length of Usage Type}) \quad \text{Equation (1)}$$

$$Kseaf=KDF(Kausf,FC,SNN,\text{length of SNN},\text{Usage}\\ \text{Type}=\text{'Slice/Service Information/AMF Set/default,'Length of Usage Type}) \quad \text{Equation (2)}$$

Where "KDF" represents the Key Derivation Function (e.g., a hash derivation). The FC number space used is controlled by 3GPP TS 33.220. The FC is just a number space FC is used to distinguish between different instances of the algorithm, where FC values allocated for the present disclosure are in range of 0x69-0x76.

As used herein, the key input 'Usage Type' may contain an indicator corresponding to the specified usage can be used as input in the key derivation. Alternatively, the key input 'Usage Type' contains a keyword specific to the usage type can be used as input in the key derivation. Note that any key derivation (e.g., 'K' derived from input key 'KEY') described herein will take the form 'K=KDF (KEY, S)' here S will contain one or more inputs as described herein.

At Step 4b, the AUSF 305 sends the authentication result (e.g., 'EAP success' if EAP-AKA' is used or 'Authentication success' if 5G AKA is used), SUPI, Kseaf to the CSEAF 303 in Nausf_UEAuthentication_Authenticate Response message. Note that for Option 2, the AUSF 305 additionally sends the newly derived Kcseaf.

Continuing on FIG. 3B, at Step 5 the CSEAF 303 stores the received SUPI along with the SUCI, Kseaf and for (Option 2) Kcseaf is also stored. If no Kseaf is received from the AUSF and only Kcseaf is received (Option 2), the CSEAF 303 derives the Kseaf (the default anchor key) for a set of AMFs based on slice security requirements (such as one for default slice or one each for slices with strict isolation requirements when required) as follows $$Kseaf=KDF(Kcseaf,FC,SNN,\text{length of SNN},\text{Usage}\\ \text{Type}=\text{'Slice/Service Information/AMF Set/default,'Length of Usage Type}) \quad \text{Equation (3)}$$

Alternatively, if the CSEAF 303 received only Kseaf from the AUSF 305 and no Kcseaf is received, then the CSEAF 303 locally stores the Kseaf derives the slice specific AMF keys (Kamf) or SEAF keys (Kseaf) from the locally stored Kseaf when required.

The CSEAF 303 assigns a special Anti-Bidding down Between Architectures ("ABBA") parameter value (e.g., 0x0001) dedicated for Slice specific security feature defined for 5GS. The CSEAF 303 assigns the New Generation Key Set Identifier ("ngKSI") to uniquely identify the UE security context and related information (such as SUPI, Kcseaf, Kseaf, Kamf and ABBA parameter) handled and stored at the CSEAF 303. As used herein the term "special ABBA" refers to the ABBA parameter having the special value dedicated for Slice specific security feature.

In addition, if the CSEAF 303 received authentication request from initial AMF directly (i.e., Option 1, where the AMF does not have a co-located SEAF), the Standalone SEAF (as per Option 1) also derives the Kamf from Kseaf.

At Step 6, the CSEAF 303 sends the Nescaf_UEAuthentication_Authenticate Response Result message to the SEAF of the Initial AMF/SEAF 301 (also referred to as "Initial SEAF"), where the message contains the authentication result as "Success", the ngKSI, special ABBA parameter and Kseaf. The Initial SEAF further derives the Kamf key from the Kseaf and provides the AMF with the Kamf key, the ngKSI, its own ABBA parameter, the CSEAF-provided ABBA parameter and the authentication result.

Alternatively, for Option 1, for the case where the initial AMF does not have any co-located SEAF, then the CSEAF 303 (i.e., Standalone SEAF here) sends the Kamf derived in step 5 to the initial AMF along with the authentication result, default ABBA parameter (as in 33.501 Annex A.7.1), the special ABBA parameter and ngKSI.

At Step 7, the initial AMF/SEAF 301 then sends the N1 message (which can be a NAS Security mode command message) to the UE 205 containing the authentication result, the ngKSI, the default ABBA parameter (ABBA value 1), and (Option 2) the special ABBA parameter (ABBA Value 2). The special ABBA parameter value allows the UE 205 to derive Kcseaf and Kseaf keys similar to the network as specified in steps 4a, 4b and 5.

At Steps 8a, following the step 7 the UE 205 and the network successfully performs the NAS and AS security mode command procedures, e.g., as described in TS 33.501, and a successful registration is accomplished, as described in TS 23.502.

At Step 8b, after a successful registration procedure, the initial AMF/SEAF 301 sends the Registration Accept message to the UE 205.

Figure 4A:
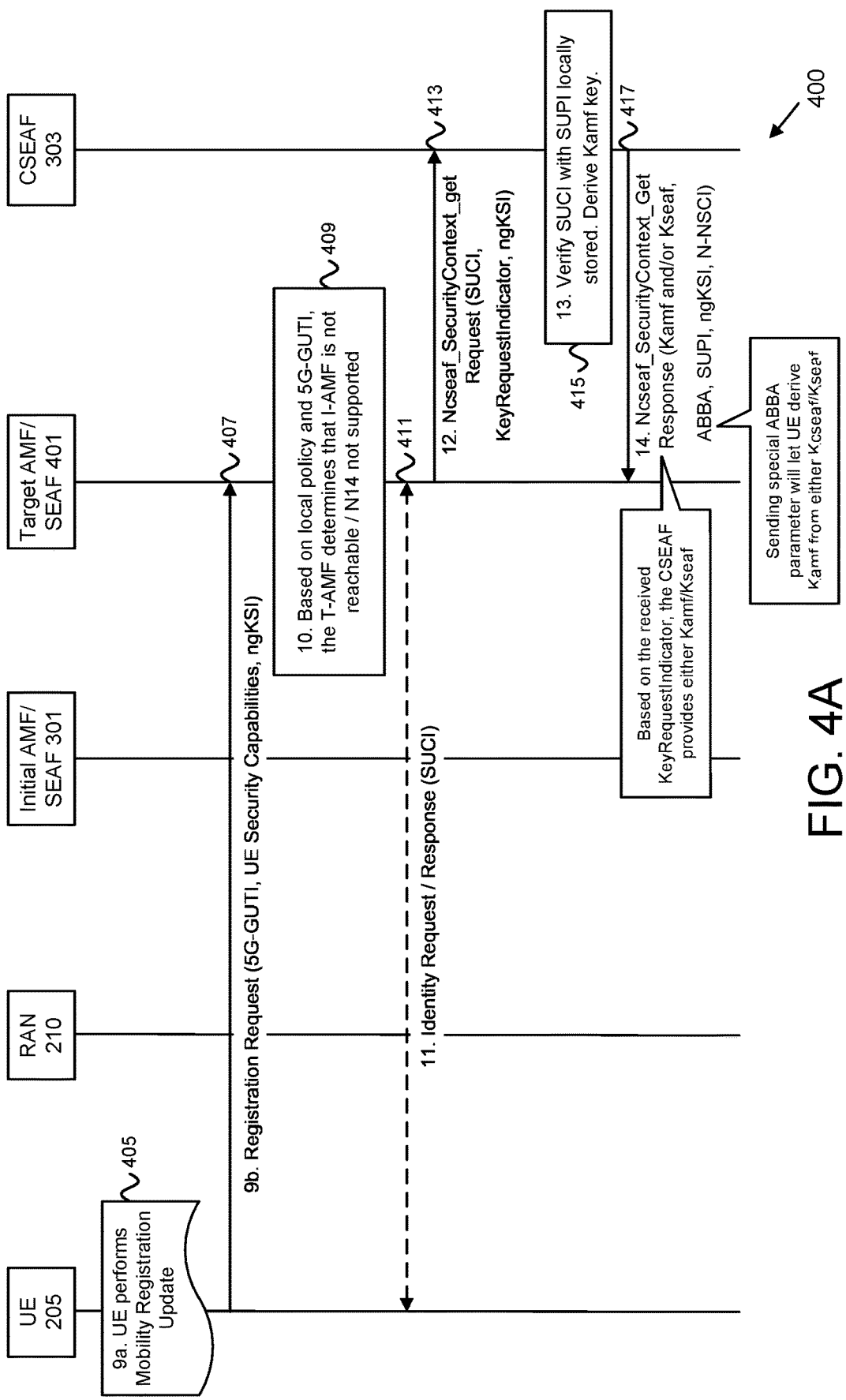
FIG. 4A depicts a signal flow diagram illustrating one embodiment of solution for NAS security handling for mobility registration update.
Figure 4B:
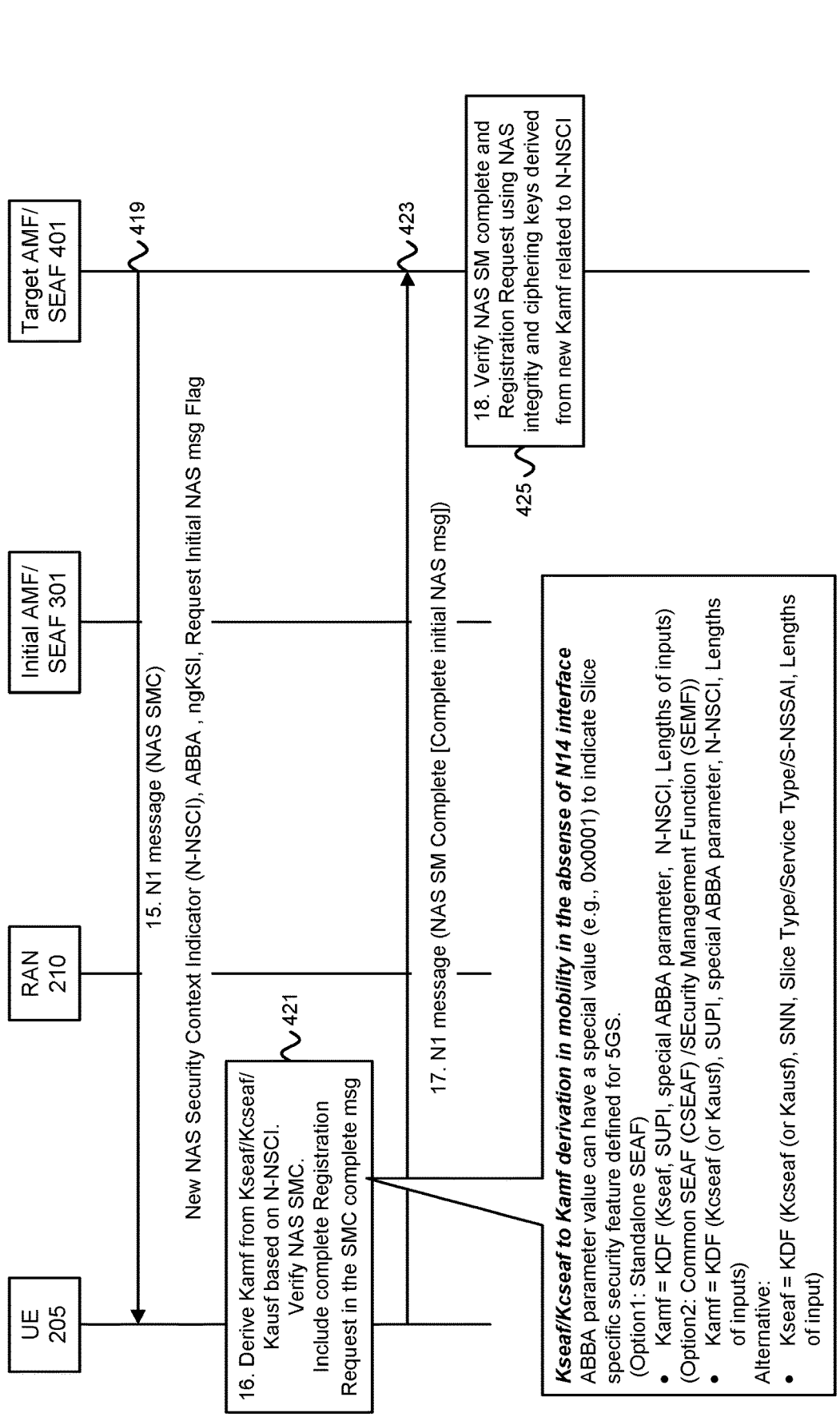
FIG. 4B is a continuation of the signal flow diagram of FIG. 4A.

FIGS. 4A-4B depict signaling flow for a procedure 400 illustrating one embodiment of NAS security handling during mobility registration update, according to embodiments of the first solution. The procedure 300 involves the UE 205, the RAN 210, The initial AMF/SEAF 301 (also referred to as "Source AMF/SEAF"), a Target AMF with co-located SEAF (depicted as combined entity "Target AMF/SEAF" 401), and the CSEAF 303.

The procedure 400 begins at Step 9a as the UE 205 on mobility upon changing to new Tracking area initiates the Registration procedure of type, 'Mobility Registration Update' via a new Target AMF 401 (see block 405). A Mobility Registration Update occurs for a UE 205 for various specific reasons (i.e., the UE 205 is in RM-REGISTERED state and initiates a Registration procedure due to mobility or due to the UE 205 needs to update its capabilities or protocol parameters, or to request a change of the set of network slices it is allowed to use).

At Step 9b, because the UE 205 is already registered (e.g., as shown in step 1-8b of FIGS. 3A-3B) and contains the NAS security context, the UE 205 sends the Registration Request message, both integrity and confidentiality protected, to the Target AMF 401 (see messaging 407). But in addition, the Registration Request message contains the cleartext IEs (example: subscription identifiers (e.g., SUCI or GUTIs), UE security capabilities, ngKSI, indication that the UE is moving from EPC, Additional GUTI, and IE containing the TAU Request in the case idle mobility from LTE).

At Step 10, the Target AMF 401 on receiving the registration request message, based on the cleartext IE (i.e., 5G-GUTI) Target AMF 401 finds that the UE's security context is available with a different AMF (i.e., here the initial AMF 301) and finds that due to strict slice isolation requirements it does not share a N14 interface with the source AMF ("S-AMF", i.e., the Initial AMF 301) (see block 409). Alternatively, if the Target AMF 401 received SUCI instead of 5G-GUTI then step 11a-11b are skipped. Either way (whether a Target AMF 401 received 5G-GUTI or SUCI) because the Target AMF 401 does not have any of the UE 205's NAS security context to verify integrity and decrypt the received Registration Request message the Target AMF 401 determines to fetch the UE security context (i.e., NAS Security context) from the CSEAF 303 (i.e., Common SEAF if option 2 or Standalone SEAF if option 1).

At conditional Steps 11a-11b, if the Target AMF 401 is unable to identify the UE 205 and then if no SUCI of the UE 205 is available at the Target AMF 401, then an identity request procedure is initiated by the Target AMF 401 by sending an Identity Request message to the UE 205 (see messaging 411). The UE 205 responds with a SUCI in the identity Response message to the Target AMF 401.

At Step 12, the Target AMF 401 sends the Noseaf_Security Context_Get Request message containing SUCI and ngKSI to the CSEAF 303 either directly (Option 1) or via the co-located SEAF (Option 2) (see messaging 413). Alternatively, the Target AMF 401 may send an Identity Request containing SUCI to the UDM and receives the Identity Response with SUPI from the UDM. Then the Target AMF 401 provides the SUPI instead of SUCI to the CSEAF 303 in step 12.

At Step 13, the CSEAF 303 verifies the SUCI and ngKSI received from the Target AMF 401 with the one locally stored and if the verification is successful, the CSEAF 303 derives the AMF Key (Kamf) by fetching the SUPI related to the SUCI using any one of the following options based on the operator deployment (see block 415). If the CSEAF 303 finds that the SUCI received form the Target AMF 401 is new (as it could not find any suitable match in the local storage), the CSEAF 303 can send a Subscription Identity Request containing SUCI to the UDM and receives the Subscription Identity Response with SUPI from the UDM. Alternatively, if the CSEAF 303 verify the SUPI (received from UDM) and ngKSI received from the Target AMF with the one locally stored and if the verification is successful, the CSEAF 303 derives the Kamf Key accordingly.

Option 1 (Standalone SEAF):

Kamf=KDF(*Kseaf*,SUPI,length of SUPI,special ABBA parameter,length of special ABBA parameter,N-NSCI,Lengths of N-NSCI)  Equation (4)

Option 2 (Common SEAF), Variant 1:

Kamf=KDF(*Kcseaf*,SUPI,length of SUPI,special ABBA parameter,length of special ABBA parameter,N-NSCI,Lengths of N-NSCI)  Equation (5)

Option 2 (Common SEAF), Variant 2:

Kamf=KDF(*Kseaf*,SUPI,length of SUPI,special ABBA parameter,length of special ABBA parameter,N-NSCI,Lengths of N-NSCI)  Equation (6)

Note that the Kseaf used as input KEY in Kamf derivation in variant 2 of option 2 is either the one provided by AUSF or one derived by CSEAF 303 (based on operator deployment.)

At Step 14, the CSEAF 303 (Option 2) sends the Ncseaf_SecurityContext_Get Response message containing Kseaf/Kamf, special ABBA parameter, ngKSI, N-NSCI and SUPI to the Target AMF 401 either directly (Kamf is sent in this case) or via the co-located Target SEAF (Kseaf is sent in this case) respectively (see messaging 417). In the latter case the co-located Target SEAF stores the Kseaf and special ABBA parameter.

In the option 2 deployment, the co-located Target SEAF may derive the Kamf (similar to Option 1 Standalone SEAF) and provide it to the Target AMF 401. Alternatively, in case of option 1 deployment, the Standalone SEAF sends only Kamf, special ABBA parameter, N-NSCI and SUPI to the Target AMF 401.

Continuing on FIG. 4B, at Step 15, the Target AMF 401 stores the received UE Security context such as Kamf, special ABBA parameter, ngKSI, N-NSCI and SUPI. The Target AMF 401 selects NAS security algorithms (integrity and ciphering algorithms) based on the UE Security Capabilities and derive Knasint and Knasenc keys (integrity and ciphering key) from Kamf received in step 14 (e.g., from Standalone SEAF or Co-located SEAF). Target AMF 401 further sends a NAS Security mode command message to the UE containing N-NSCI, special ABBA parameter and Request Initial NAS message Flag (see messaging 419).

At Step 16, the New NAS Security Context Indicator (N-NSCI) indicates the UE 205 to correctly derive a new NAS Security context (Kamf) from Kcseaf or Kseaf exactly like the way network derived the Kamf as shown in step 13 (using any one of the options based on the operator deployment). The special ABBA parameter value indicates that the new Kamf key derivation is specific to the slice security feature defined for 5GS and so the UE 205 derives Kamf from the Kseaf or Kcseaf pointed by a ngKSI instead of deriving from existing Kamf.

If the UE 205 receives the New NAS Security Context Indicator/flag set to 1 in the NAS Security Mode Command message, then the UE 205 derives a new key Kamf from the current active (Option 1) Kseaf or (Option 2) Kcseaf identified by the received ngKSI in the NAS Security Mode Command message using the uplink NAS COUNT value that was sent in the Registration Request message. The UE 205 further assign the received ngKSI in the NAS Security Mode Command message to the ngKSI of the new derived Kamf. The UE 205 may derive new NAS keys (Knasint and Knasenc) from the new Kamf, and integrity check the NAS Security Mode Command message using the new Knasint key (see block 421).

At Step 17, after a successful verification of the NAS Security Mode command message at the UE 205, the UE 205 sends the NAS Security mode complete message including the complete Registration Request message in the NAS container (see messaging 423).

At Step 18, the Target AMF 401 uses the Knasint and Knasenc derived from the new Kamf related to N-NSCI and verifies the NAS Security mode complete message using NAS integrity key (Knasint) and obtains the Registration Request message using the newly derived NAS ciphering key (Knasenc) (see block 425).

The Target AMF 401 further initiates the NGAP procedure INITIAL CONTEXT SETUP between the RAN 210 (e.g., gNB) and the UE 205, where the gNB and UE 205 perform AS Security mode command procedure to set up AS security. Further the successful UE mobility registration update is taken care by the Target AMF 401. The procedure 400 ends.

Note that in alternative embodiments, the CSEAF 303 functionality may instead be offered as a service by any well-connected NFs (such as NSSF, NRF or AUSF) to handle UE registration and services that need strict slice isolation and related security aspects. In such embodiments, the Kcseaf may be replaced with an appropriate NF key, such as Knssf, Knrf, Kausf, etc. and the service operation Ncseaf_SecurityContext_Get may be replaced with an equivalent service operation, such as Nnssf_Security Context_Get, Nnrf_Security Context_Get, Nausf_Security Context_Get, etc.

According to embodiments of the second solution, AMF reallocation procedure is enabled to handle security context provisioning at the 5G system when the two AMFs do not share a N14 interface via RAN rerouting. According to the security solution, updates to the existing 5G system include the following:

The well-connected NF (i.e., Common NF) handles primary security context storage and provisioning (e.g., based on slice security requirements).

The Common NF is used to store a high-level (i.e., primary) UE security context in the serving network (or home network) which controls the provisioning of service based/slice security isolation-based UE security context (e.g., Kseaf/Kamf) to the slice specific core network functions (SEAF, AMF etc.). As discussed above, the Common NF may be a new network function, such as a Common SEAF, a SEMF, a SECF, and/or a Standalone SEAF. Alternatively, the Common NF may be implemented by an existing 5GC NF, such as the AUSF, the NSSF, the NRF, etc.

Figure 5A:
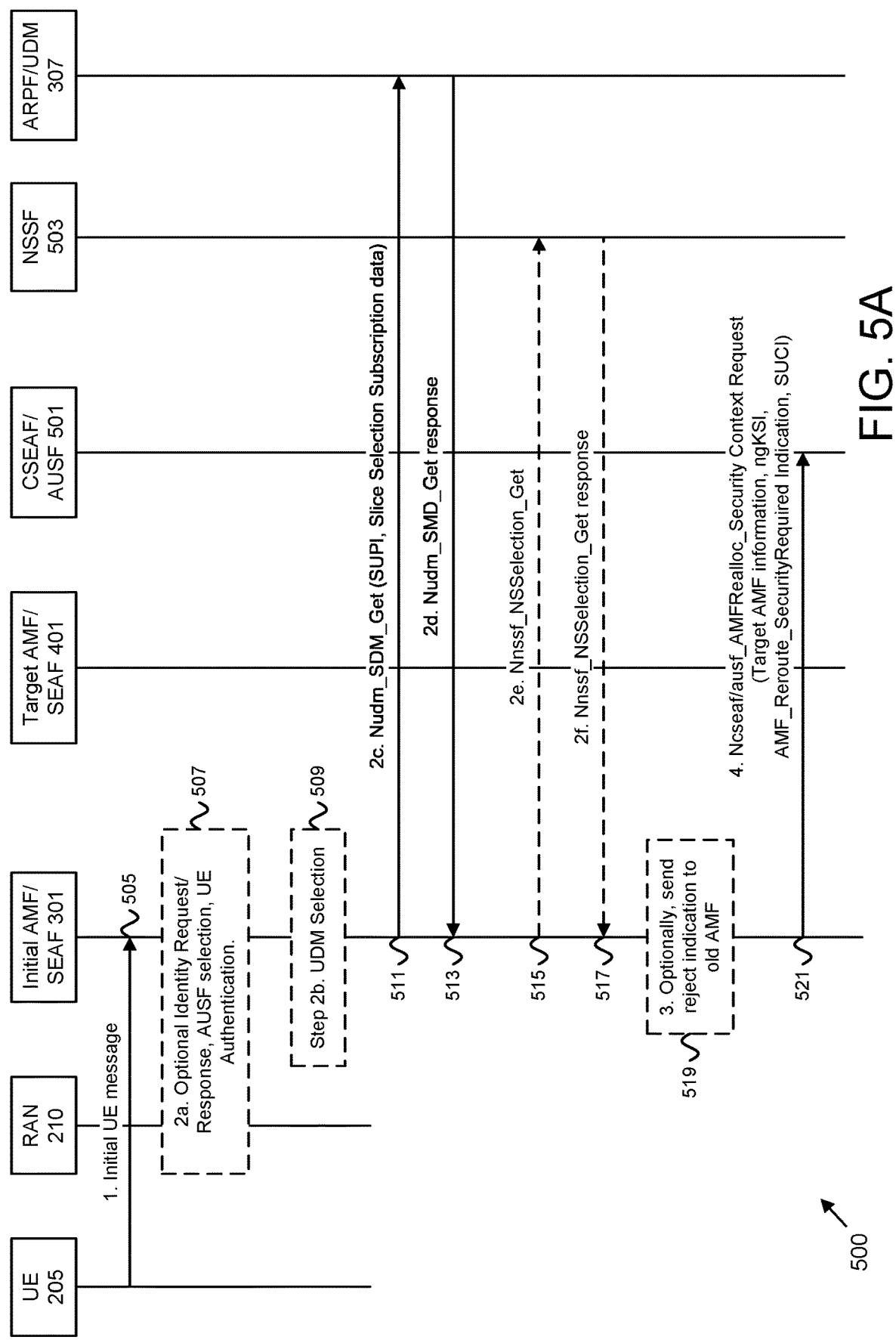
FIG. 5A depicts a signal flow diagram illustrating one embodiment of solution for NAS security handling for AMF reallocation.
Figure 5B:
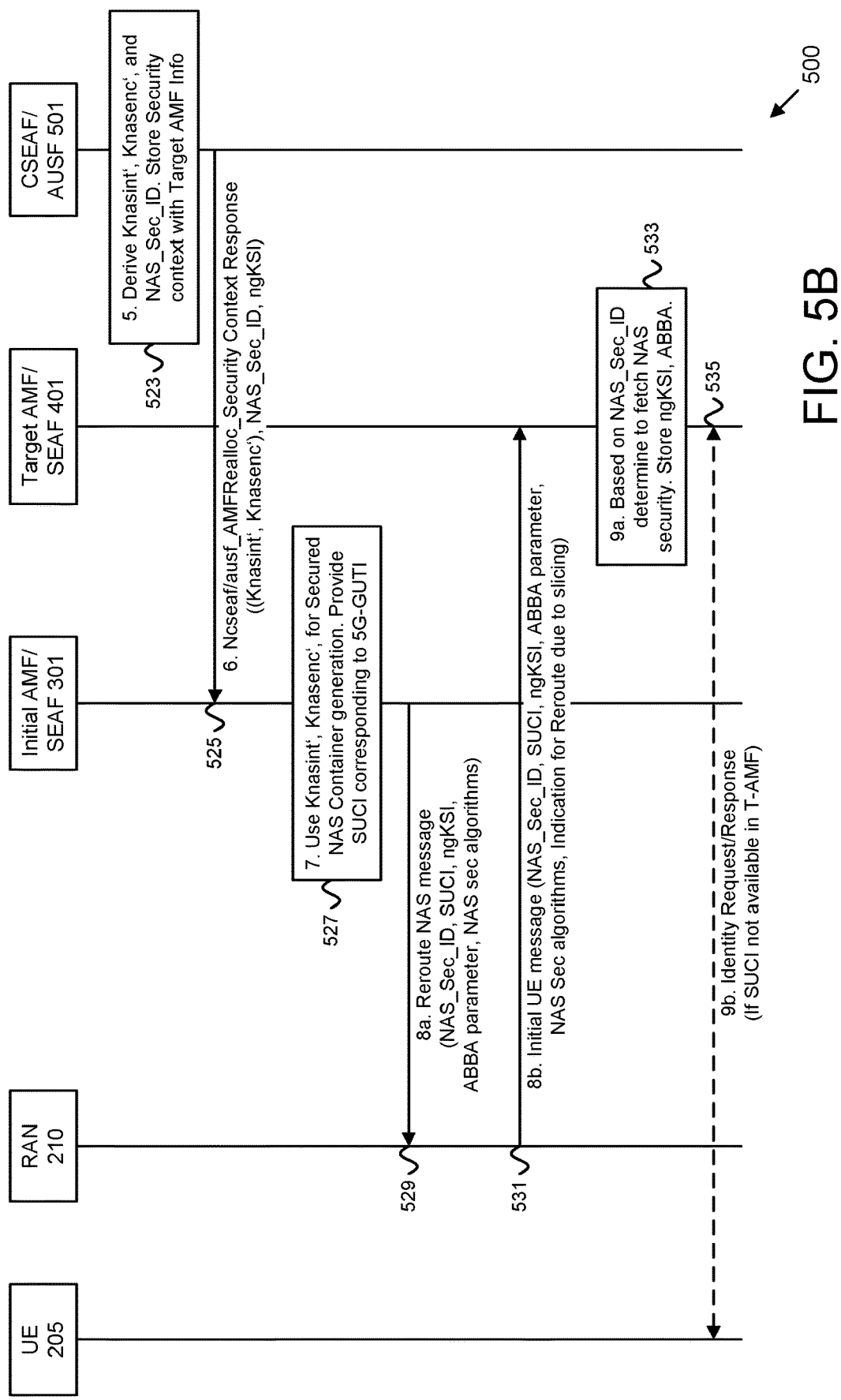
FIG. 5B is a continuation of the signal flow diagram of FIG. 5A.

The Common NF enables AMF reallocation based NAS security handling by providing a hash code to the Source/Initial AMF and verifying the same hash code issued by the Target AMF to provision the target AMF with necessary NAS security context. The service operation Ncseaf_AMFRealloc_SecurityContext is defined as follows:
  Service operation name: Ncseaf_AMFRealloc_SecurityContext.
  Description: Provides the NF requester (e.g., AMF) with hash code to enable NAS security handling during AMF reallocation.
  Inputs:
    Required: ngKSI, AMF_Reroute_SecurityRequired Indication, SUPI, Target AMF information (e.g., AMF Identifier ("ID")/AMF Network Slice Instance ("NSI") ID/AMF Set ID/AMF Service Set ID, etc.)
    Optional: None
  Outputs:
    Required: Knasint,' Knasenc,' NAS_Sec_ID (the hash code to authenticate the Target AMF), ngKSI (i.e., a key set identifier)
    Optional: None The service operation Nausf_AMFRealloc_SecurityContext is defined as follows:
  Service operation name: Nausf_AMFRealloc_SecurityContext
  Description: Provides the NF requester (e.g., AMF) with hash code to enable NAS security handling during AMF reallocation.
  Inputs:
    Required: ngKSI, AMF_Reroute_SecurityRequired Indication, SUPI, Target AMF information (e.g., AMF ID/AMF NSI ID/AMF Set ID/AMF Service Set ID, etc.)
    Optional: None
  Outputs:
    Required: Knasint,' Knasenc,' NAS_Sec_ID (the hash code to authenticate the Target AMF), ngKSI (i.e., a key set identifier)
    Optional: None The service operation Ncseaf_NASKey_Request is defined as follows:
  Service operation name: Ncseaf_NASKey_Request.
  Description: Common NF (e.g., CSEAF, AUSF) validates the NF requester (AMF/SEAF) provided hash code and if the validation is successful, the security context (i.e., Security anchor key/NAS Security key and/or Reroute NAS security context) is provided to the target AMF to handle the rerouted NAS message (i.e., initial UE message or Registration Request).
  Inputs:
    Required: SUCI, NAS_Sec_ID, AMF Information (example, AMF ID/AMF NSI ID/AMF Set ID/AMF Service Set ID, etc.)
    Optional: ngKSI
  Outputs:
    Required: SUPI, NAS_Sec_ID, (Knasint', Knasenc'), N-NSCI, Key (Kamf/Kseaf), SUPI, Special ABBA parameter (i.e., specific to slice isolation feature)
    Optional: None The service operation Nausf_NASKey_Request is defined as follows:
  Service operation name: Nausf_NASKey_Request.
  Description: Common NF (e.g., CSEAF, AUSF) validates the NF requester (AMF/SEAF) provided hash code and if the validation is successful, the security context (i.e., Security anchor key/NAS Security key and/or Reroute NAS security context) is provided to the target AMF to handle the rerouted NAS message (i.e., initial UE message or Registration Request).
  Inputs:
    Required: SUCI, NAS_Sec_ID, AMF Information (example, AMF ID/AMF NSI ID/AMF Set ID/AMF Service Set ID, etc.)
    Optional: ngKSI
  Outputs:
    Required: SUPI, NAS_Sec_ID, (Knasint', Knasenc'), N-NSCI, Key (Kamf/Kseaf), SUPI, Special ABBA parameter (i.e., specific to slice isolation feature)
    Optional: None FIGS. 5A and 5B depict signaling flow 500 illustrating one embodiment of NAS security handling during AMF reallocation based on RAN reroute during registration procedure, according to the second solution for NAS security handling for AMF reallocation. The signaling flow 500 involves the UE 205, the RAN 210, an Initial AMF with co-located SEAF (depicted as combined entity "Initial AMF/SEAF" 301), a CSEAF and/or AUSF (representative of the Common NF) 501, and the Authentication credential Repository and Processing Function ("ARPF") co-located with UDM (depicted as combined entity "ARPF/UDM" 307).

At Step 1, the UE sends the Registration Request to the RAN and the RAN sends the Registration Request message within an Initial UE message to the initial AMF (see messaging 505).

At optional Step 2a, if the AMF needs the SUPI and/or UE's subscription information to decide whether to reroute the Registration Request or if the Registration Request was not sent integrity protected or integrity protection is indicated as failed, then AMF performs optionally performs UE identity Request/Response, AUSF selection, UE authentication, e.g., as described in steps 4 to 9a/9b of 3GPP TS 23.502 FIG. 4.2.2.2.2-1 (see block 507).

Where at this step, the UE and network authentication would have been successfully completed and following a successful authentication, the NAS security between the UE and the initial AMF would also have been successfully setup. The UE will contain the NAS security context. The initial AMF will contain the NAS security context for the UE.

At conditional Step 2b, if the initial AMF needs UE's subscription information to decide whether to reroute the Registration Request and UE's slice selection subscription information was not provided by old AMF, the AMF selects a UDM, e.g., as described in 3GPP TS 23.501, clause 6.3.8 (see block 509).

At Step 2c, when the Initial AMF/SEAF 301 has no slice selection subscription data for the UE 205, then the Initial AMF/SEAF 301 requests Subscriber data from the UDM, e.g., by invoking the Nudm_SDM_Get request service operation, e.g., as described in 3GPP TS 23.502, clause 5.2.3.3.1 (see messaging 511). Here, the Nudm_SDM_Get request includes the UE 205's identity (e.g., SUPI) and Slice Selection Subscription data indication. In certain embodiments, the UDM may get this information from UDR, e.g., by using Nudr_DM_Query (SUPI, Slice Selection Subscription data).

At Step 2d, the UDM returns Subscriber data to the Initial AMF/SEAF 301, e.g., by invoking the Nudm_SDM_Get response service operation (see messaging 513). The Initial AMF/SEAF 301 gets the Slice Selection Subscription data including Subscribed S-NSSAIs.

At Conditional Step 2e, if there is a need for slice selection, (see clause 5.15.5.2.1 of TS 23.501), e.g., the initial AMF cannot serve all the S-NSSAI(s) from the Requested NSSAI permitted by the subscription information, the initial AMF invokes the Nnssf NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE (see messaging 515).

At Step 2f, the NSSF 503 returns to the initial AMF/SEAF 301 the Allowed NSSAI for the first access type, optionally the Mapping of Allowed NSSAI, the Allowed NSSAI for the second access type (if any), optionally the Mapping of Allowed NSSAI and the target AMF Set or, based on configuration, the list of candidate AMF(s) (see messaging 517). The NSSF 503 may perform the steps specified in point (B) in clause 5.15.5.2.1 of 3GPP TS 23.501.

The NSSF 503 may return NSI ID(s) associated to the Network Slice instance(s) corresponding to certain S-NSSAI(s). The NSSF may return the NRF(s) to be used to select NFs/services within the selected Network Slice instance(s). It may also return information regarding rejection causes for S-NSSAI(s) not included in the Allowed NSSAI. The NSSF may return Configured NSSAI for the Serving PLMN, and possibly the associated mapping of the Configured NSSAI.

At Step 3, optionally, the initial AMF/SEAF 301 sends a reject indication to the old AMF, e.g., informing that the UE Registration procedure did not fully complete at initial AMF/SEAF 301 (see block 519). Further if the initial AMF if does not locally stores the target AMF address, and if the reroute via NG-RAN message needs to include AMF address then the initial AMF invokes the Nnrf_NFDiscovery_Request service operation from the NRF to find a proper target AMF which has required NF capabilities to serve the UE. The NF type is set to AMF. The AMF Set is included in the Nnrf_NFDiscovery_Request. Further the NRF sends the initial AMF, the Response to Nnrf_NFDiscovery_Request (list of (AMF pointer, AMF address, plus additional selection rules and NF capabilities)). The NRF replies with the list of potential target AMF(s).

At Step 4, due to strict slice isolation requirements, the initial AMF/SEAF 301 determines to reroute the NAS message to the Target AMF via NG-RAN, but the main issue here is that the Target AMF cannot fetch the UE's NAS security context (i.e., Kamf) from the initial AMF either directly (as there is no N14 interface) nor via NGRAN (as NAS security context cannot be exposed to the NGRAN performing the routing of initial NAS message).

To facilitate NAS security context provisioning to the Target AMF for the corresponding UE's ongoing registration procedure, the CSEAF is deployed in the 5GS. Note, that a CSEAF can be called as a standalone SEAF, only when no AMF has a co-located SEAF. Alternatively, the CSEAF may be replaced with an AUSF, where the AUSF implements UE security handling/provisioning as described herein. Accordingly, the element CSEAF/AUSF 501 may be either an CSEAF (e.g., common SEAF or standalone SEAF) or the well-connected NF (e.g., AUSF), depending on network implementation.

If the Initial AMF/SEAF 301 has the complete initial NAS message received from the UE 205 in NAS SMC complete, the initial AMF/SEAF 301 can send the complete initial NAS message (which is both integrity and confidentiality protected) to the Target AMF/SEAF 401 via RAN 210 in a protected NAS container by requesting a Reroute NAS security context from CSEAF/AUSF 501 for the reroute message protection (see messaging 521).

Alternatively, if the Initial AMF/SEAF 301 determines to reroute only the received initial NAS message (the initial NAS message received in step 1), then the initial AMF/SEAF 301 may just reroute the initial NAS message as received from the UE 205. The Initial AMF/SEAF 301 after determining to reroute via RAN 210, sends to the CSEAF/AUSF 501 a Ncseaf_AMFRealloc_SecurityContext (alternatively, Nausf_AMFRealloc_SecurityContext) Request message containing Target AMF information, ngKSI (used to identify the UE's security context in the network), AMF_Reroute_SecurityRequired Indication and User Subscription Identifier(s) (e.g., SUCI and optionally one or more identifiers related to the UE 205, i.e., SUPI and/or 5G-GUTI).

Continuing on FIG. 5B, at Step 5, on receiving a Ncseaf_AMFRealloc_Security Context Request message, the CSEAF/AUSF 501 based on the SUCI finds the SUCI-SUPI pair from its local memory and then based on the retrieved SUPI and received ngKSI identifies the locally stored security context. Further the CSEAF/AUSF 501 generates the reroute security context (Knasint' and Knasenc', NAS_Sec_ID) from the locally stored (Option 1) Kseaf or (Option 2) Kcseaf/Kausf identified corresponding to the ngKSI using any of the following key derivation formulas (based on the operator's deployment) (see block 523).

If the reroute security context need to be derived from a Kseaf/Kcseaf/Kausf as input security KEY, then the CSEAF/AUSF 501 can readily fetch the Kseaf/Kcseaf/Kausf which is stored from its local memory. Else if the reroute security context need to be derived from a Kamf as input security KEY, then the either the initial AMF can CSEAF/AUSF 501 should first derive the Kamf from the Kseaf/Kcseaf/Kausf as follows prior to the reroute security context derivation.

Regarding NAS Container Security context generation for AMF reallocation, the ABBA parameter value can have a special value (e.g., 0x0001) to denote Slice specific security feature defined for 5GS.

Regarding Reroute Security Context Derivation at the CSEAF/AUSF 501, the specific key derivations may be based on the particular NF deployed. Here, the input "T-AMF-ID" represents AMF Identity Information of the Target AMF/SEAF 401, such as one or more of: Target AMF ID, Target AMF NSI ID, Target AMF Set ID, Target AMF Service Set ID, etc. For Option 1 (i.e., Standalone SEAF)

$Knasint'=KDF(Kamf,$T-AMF-ID,SUPI,S-NSSAI/any Slice information,Usage type 'NAS Container Integrity,'length of each inputs) Equation (7)

$Knasenc'=KDF(Kamf,$T-AMF-ID,SUPI,S-NSSAI/any slice information,Usage type 'NAS Container confidentiality,'lengths of each inputs) Equation (8)

$NAS\_Sec\_ID=Hash(Knasint, 'Knasenc,'$SUPI,Target AMF Information,'$Kseaf$') Equation (9)

$Kamf=KDF(Kseaf,$SUPI,ABBA parameter,Any Slice Information,N-NSCI,Lengths of inputs) Equation (10)

For Option 3 (i.e., Common SEAF or SEMF)

$Knasint'=KDF(Kcseaf$(or $Ksemf)/Kamf^*,$T-AMF-ID, length of T-AMF-ID,SUPI,length of SUPI,S-NSSAI/Any Slice Information,length of Slice Info,Usage type 'NAS Container Integrity,'length of Usage Type) Equation (11)

$Knasenc'=KDF(Kseaf/Kcseaf$(or $Ksemf)/Kamf^*,$T-AMF-ID,length of T-AMF-ID,SUPI,length of SUPI,S-NSSAI/Any Slice Information,length of Slice Info,Usage type 'NAS Container confidentiality,'length of Usage Type) Equation (12)

$NAS\_Sec\_ID=Hash(Knasint, 'Knasenc,'$SUPI,Target AMF Information,'$Kcseaf$') Equation (13)

$Kamf^*=KDF(Kseaf/Kcseaf/Ksemf,$T-AMF-ID,SUPI, lengths of inputs) Equation (14)

For Option 3 (i.e., AUSF)

$Knasint'=KDF(Kausf/Kamf^*,$T-AMF-ID,length of T-AMF-ID,SUPI,length of SUPI,S-NSSAI/Any Slice Information,length of Slice Info,Usage type 'NAS Container Integrity,'length of Usage Type) Equation (15)

$Knasenc'=KDF(Kseaf/Kausf/Kamf^*,$T-AMF-ID,length of T-AMF-ID,SUPI,length of SUPI,S-NSSAI/Any Slice Information,length of Slice Info,Usage type 'NAS Container confidentiality,'length of Usage Type) Equation (16)

$NAS\_Sec\_ID=Hash(Knasint, 'Knasenc,'$SUPI,Target AMF Information,'$Kausf$') Equation (17)

$Kamf^*=KDF(Kseaf/Kausf,$T-AMF-ID,SUPI,lengths of inputs) Equation (18)

The CSEAF/AUSF 501 locally stores the derived reroute security context along with the ngKSI, Knasint' (reroute integrity key), Knasenc' (reroute encryption key) and the hash code (NAS_Sec_ID) generated for the Target AMF authentication.

At Step 6, the CSEAF/AUSF 501 sends reroute security context Knasint', Knasenc', NAS_Sec_ID and ngKSI to the initial AMF in the Ncseaf_AMFRealloc_Security Context Response message (alternatively, Nausf_AMFRealloc_Security Context Response message) (see messaging 525).

At Step 7, the initial AMF on receiving the reroute security context, uses the Knasint', Knasenc' to confidentiality and integrity protect the complete initial UE message/initial UE message along with NAS_Sec_ID, ABBA parameter, SUPI, Security algorithm IDs (used for Reroute NAS message protection) and ngKSI to reroute to the Target AMF/SEAF 401 via NG-RAN (see block 527).

Step 8a, the initial AMF/SEAF 301 sends the protected complete initial NAS message or initial NAS message along with 5G-GUTI/SUCI and CSEAF/AUSF 501 provided NAS_Sec_ID, ABBA parameter and ngKSI in a Reroute NAS message to NG-RAN (scc messaging 529). The reroute NAS message also contains cleartext NAS_Sec_ID, ngKSI, 5G-GUTI/SUCI, and ABBA parameters. If a protected NAS message is sent in the reroute message, then the initial AMF can also send the NAS security algorithm used for the ciphering and integrity protection. The reroute NAS message also contains the indication for reroute due to slicing and Target AMF information.

Additional information such as NAS_Sec_ID, special ABBA parameter, Security Algorithm IDs can be combinedly called as Reroute Security Information which is sent by the initial AMF/SEAF 301 along with Reroute NAS message in a NAS container to the Target AMF/SEAF 401 via RAN 210 when a complete initial UE message is sent to Target AMF/SEAF 401. Alternatively, if the initial AMF/SEAF 301 sends just the initial UE message, then the Reroute Security Information can be sent in clear text to the Target AMF/SEAF 401, in which case the Reroute Security Information will contain SUCI instead of SUPI, rest other information elements will the same as specified in the above steps.

The Reroute NAS message if sent in a protected NAS container, it includes 2 parts such as confidentiality and integrity protected part (complete UE initial message, SUPI and Reroute Security Information) and Cleartext IEs (e.g., SUCI or 5G-GUTI, Reroute Security Information).

Alternatively, if the reroute NAS message if sent unprotected, it includes 2 parts such as initial UE message along with clear text IEs sent by UE in step 1 and additional Cleartext IEs (SUCI, Reroute Security Information).

At Step 8b, the NG-RAN 210 forwards the received reroute NAS message to the appropriate Target AMF Target AMF/SEAF 401 (see messaging 531).

At Step 9a, after receiving the reroute NAS message with NAS_Sec_ID (as part of cleartext Reroute security information), the Target AMF/SEAF 401 determines that, it should fetch the corresponding reroute security context from the CSEAF/AUSF 501 to decrypt the complete UE initial NAS message if it received a protected NAS container (see block 533). The Target AMF/SEAF 401 locally stores the cleartext IEs such as ABBA parameter, ngKSI, 5G-GUTI/SUCI, NAS Security algorithm IDs along with NAS_Sec_ID (as part of Re-route security information).

At optional Step 9b, if the Target AMF/SEAF 401 received 5G-GUTI and have not receive any SUCI of the UE 205, then an Identity Request procedure can be initiated by the Target AMF/SEAF 401 with the UE 205 to receive the SUCI (see messaging 535). The UE 205 provided SUCI is stored in the Target AMF/SEAF 401 and the 5G-GUTI is deleted.

Figure 5C:
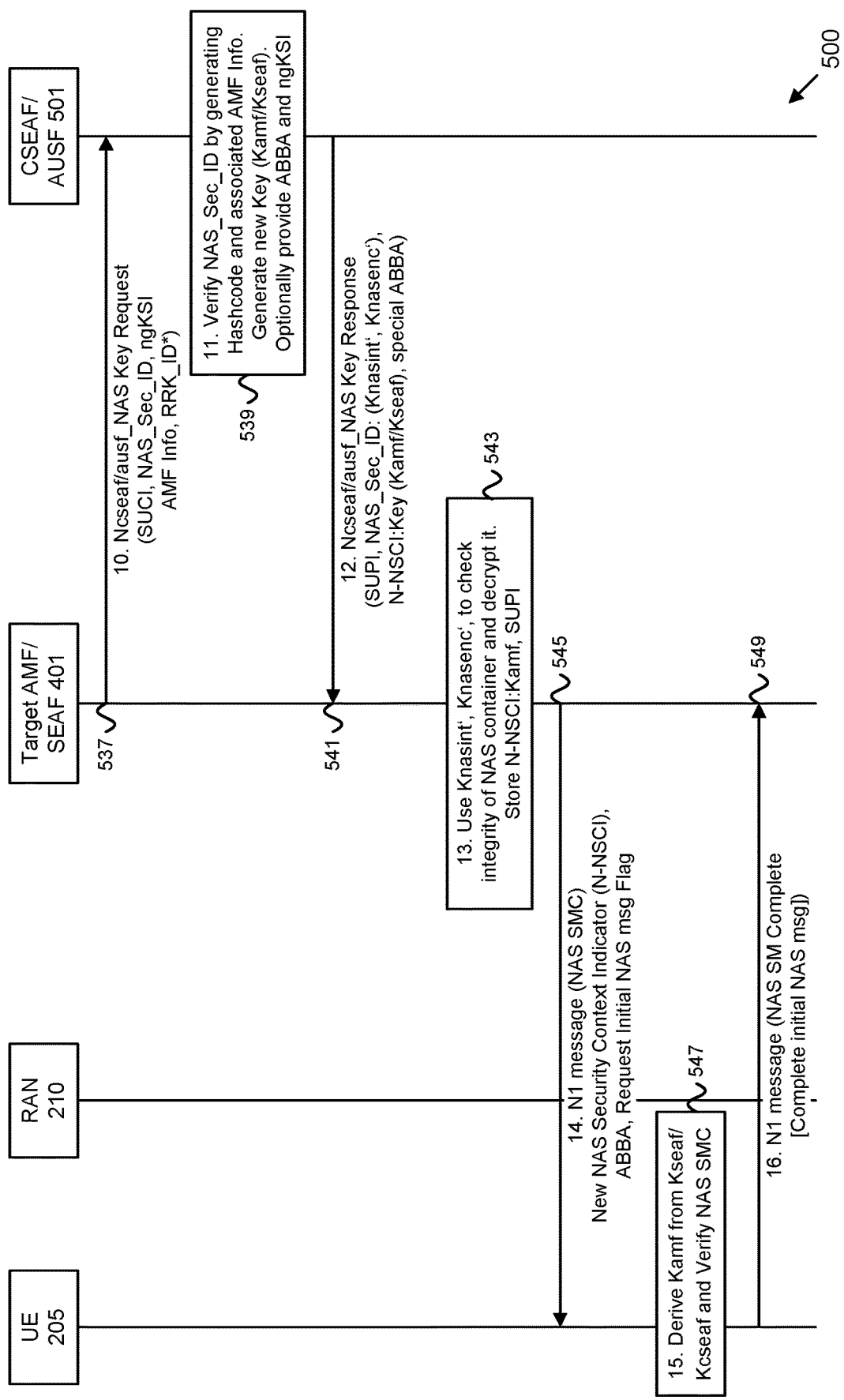
FIG. 5C is a continuation of the signal flow diagrams of FIGS. 5A and 5B.

Continuing on FIG. 5C, at Step 10, the Target AMF/SEAF 401 on receiving NAS_Sec_ID sends the Ncseaf_NASKey_Request message (alternatively, Nausf_NASKey_Request message) to the CSEAF/AUSF 501 containing the SUCI (i.e., a UE ID such as SUCI or 5G-GUTI), NAS_Sec_ID, ngKSI and Target AMF information (such as AMF Set ID, AMF ID or NSI ID, etc.) (see messaging 537). If the Target AMF/SEAF 401 received a protected NAS container in step 8b, then it includes Reroute Key indicator (RRK_ID) in Ncseaf_NASKey_Request message to request Knasint' and Knasenc' keys from the CSEAF/AUSF 501.

Otherwise, if the Target AMF/SEAF 401 received an unprotected initial UE message, then it skips Reroute Key indicator (RRK_ID) while sending NAS_Sec_ID in Ncseaf_NASKey_Request message.

At Step 11, the CSEAF/AUSF 501 on receiving the NAS_Sec_ID and ngKSI (the hash of the reroute keys) verifies the NAS_Sec_ID by retrieving the related reroute security context (see block 539). If the NAS_Sec_ID validation is successful, the CSEAF/AUSF 501 generates the new NAS security context (Kamf) (alternatively, a security context i.e., security anchor key) to be provided for the Target AMF/SEAF 401 as given below.

$$Kamf=KDF(Kcseaf(\text{or } Kseaf \text{ or } Kausf), \text{SUPI,length of SUPI,ABBA parameter,length of ABBA,Slice Type/Service Type/S-NSSAI,Length of Slice Info,N-NSCI,length of N-NSCI)} \quad \text{Equation (19)}$$

Further if a SUCI (i.e., a UE ID such as SUCI or 5G-GUTI) is received, the CSEAF/AUSF 501 fetches the SUPI corresponding to the SUCI (i.e., a UE ID such as SUCI or 5G-GUTI) from its local memory. If the CSEAF/AUSF 501 receives the RRK_ID, then it determines to provide also the reroute security context.

At Step 12, the CSEAF/AUSF 501 sends to the Target AMF/SEAF 401 the Ncseaf_NASKey_Response message (alternatively, Nausf_NASKey_Response) containing SUPI, Reroute Security context (Knasint', Knasenc') related to NAS_Sec_ID, Kamf (alternatively, a security context i.e., security anchor key), N-NSCI (to indicate to the Target AMF/SEAF 401 that the Kamf is derived from Kseaf/Kcseaf/Kausf) and a special ABBA parameter (to indicate Slice specific security feature defined for 5G) (see messaging 541).

At Step 13, the Target AMF/SEAF 401 locally stores the received SUPI, Reroute Security context (Knasint', Knasenc') related to NAS_Sec_ID, N-NSCI, Kamf, and the special ABBA parameter along with the ngKSI. Further the Target AMF/SEAF 401 uses the Knasint' key to verify the integrity of the reroute NAS message received from initial AMF/SEAF 301 and uses the Knasenc' key to decrypt the complete UE initial message (i.e., Registration Request message) (see block 543). On retrieving the Registration Request, as the Target AMF/SEAF 401 now possess the UE ID (SUPI) and the NAS security context (Kamf), it initiates a NAS security mode command with the UE 205 to align the new NAS security context with the UE 205.

Alternatively, if the Target AMF/SEAF 401 having only the initial UE message (unprotected) and cleartext IEs (includes subscription identifiers (e.g., SUCI or GUTIs), UE security capabilities, ngKSI) with all information received from CSEAF/AUSF 501 as in step 13 except reroute security context, then with SUPI and Kamf received from CSEAF/AUSF 501, the Target AMF/SEAF 401 initiates the NAS SMC.

At Step 14, the Target AMF/SEAF 401 selects the NAS security algorithms (integrity and ciphering algorithms) based on the UE security capabilities and sends a NAS security mode command message with the UE 205 which contains the New NAS Security Context Indicator (N-NSCI), the special ABBA parameter value, and optionally the Request Initial NAS message flag (see messaging 545).

At Step 15, the UE 205 on receiving the N-NSCI in the NAS Security mode command message, the UE 205 uses a Kseaf/Kcseaf/Kausf locally stored or newly derived one to derive a Kamf (alternatively, a security context, i.e., security anchor key and Kamf) as shown below similar to the CSEAF/AUSF 501 and the one available in the Target AMF/SEAF 401 (see block 547). The UE 205 uses the special ABBA parameter and N-NSCI received in the Kamf generation. The UE 205 also stores the NAS security algorithms indicated by the Target AMF/SEAF 401.

$$Kamf=KDF(Kcseaf(\text{or } Kseaf \text{ or } Kausf), \text{SUPI,length of SUPI ABBA parameter,length of ABBA,Slice Type/Service Type/S-NSSAI,Length of Slice Info,N-NSCI,length of N-NSCI)} \quad \text{Equation (20)}$$

At Step 16, the UE 205 after a successful validation of the NAS Security mode command message, it sends a NAS security mode complete message to the Target AMF/SEAF 401 (see messaging 549).

After a successful NAS Security mode command procedure between the Target AMF/SEAF 401 and the UE 205, the Target AMF/SEAF 401 sends an initial Context setup message to the NG-RAN 210 to initiate AS SMC between the UE 205 and NG-RAN 210 to set up AS Security based on the new NAS security context available in the Target AMF/SEAF 401. The UE registration procedure executes similar to the existing 5G System.

Figure 6:
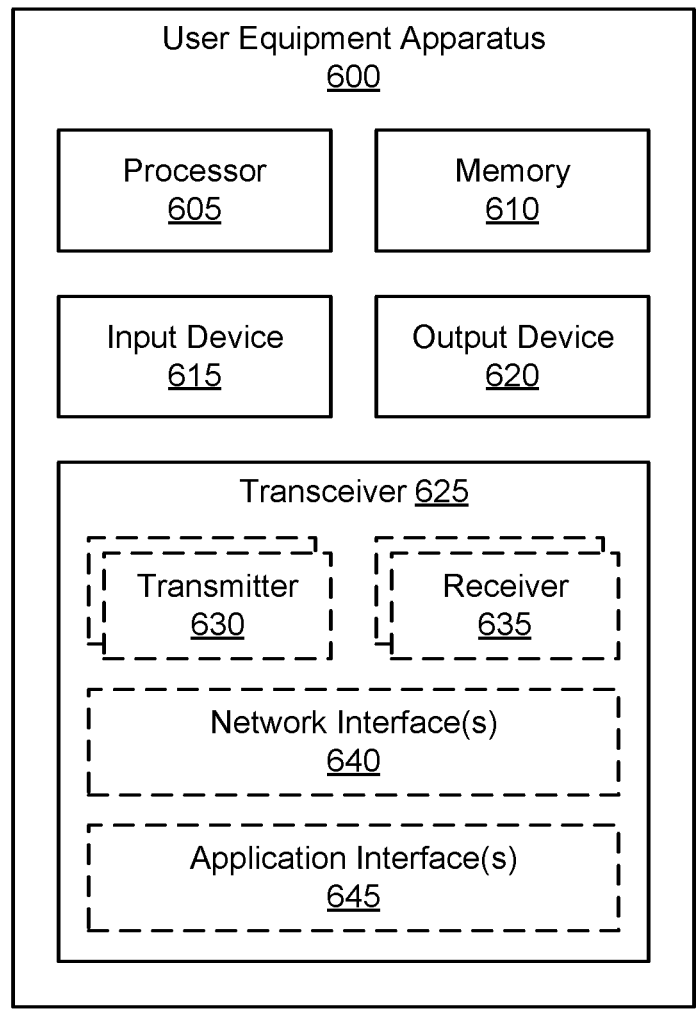
FIG. 6 is a diagram illustrating one embodiment of a user equipment apparatus that may be used for security context handling during AMF reallocation.

FIG. 6 depicts a user equipment apparatus 600 that may be used security context handling during AMF reallocation, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panel supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

In various embodiments, via the transceiver 625, the processor 605 receives a NAS Security mode command message from a Target AMF, where the NAS Security mode command message includes at least one of: a N-NSCI, an ABBA parameter having a special value (i.e., a slice specific isolation feature), and a KSI (e.g., a key set identifier). The processor 605 derives a new SEAF key (i.e., Kseaf) from a primary UE security context (e.g., from Kausf) in response to the ABBA parameter having the special value and further in response to the N-NSCI. The processor 605 derives a new AMF key (i.e., Kamf) from the primary UE security context (e.g., from the new Kseaf) in response to the N-NSCI.

The processor 605 verifies the NAS Security mode command message using a NAS integrity key derived from the new Kamf and using a NAS ciphering key derived from the new Kamf. The processor 605 stores the Kamf along with the N-NSCI, the KSI and the ABBA parameter having the special value to the memory 610 in response to successful verification of the NAS Security mode command message. Via the transceiver 625, the processor 605 sends the NAS Security mode complete message to the Target AMF, where the NAS Security mode complete message includes an N-NSCI Acknowledgement.

In some embodiments, the transceiver 625 receives a NAS Security mode command message from an initial AMF, where the NAS Security mode command message includes the ABBA parameter having the special value and the KSI. In such embodiments, the processor 605 verifies the NAS Security mode command message using a NAS security context and stores the ABBA parameter having the special value and the KSI to the memory 610 in response to successful verification of the NAS Security mode command message. Here, the processor 605 also generates the primary UE security context (e.g., generating a new Kseaf from Kausf) in response to receiving the ABBA parameter having the special value.

In some embodiments, the primary UE security context includes an AUSF key (i.e., Kausf). In such embodiments, the processor 605 derives the new Kseaf by using the Kausf as an input key and using at least one of the following input values: the ABBA parameter having the special value (i.e., a slice specific isolation feature), length of the ABBA parameter, Usage Type='Slice/Service Information/AMF Set/default', and Length of Usage Type. In certain embodiments, the processor 605 derives the new Kamf from the primary UE security context by using the derived new Kseaf as an input key and using at least one of the following input values: SUPI, length of SUPI, the ABBA parameter having the special value, length of the ABBA parameter, the N-NSCI, and Length of N-NSCI. Here, the NAS Security mode command message containing the ABBA parameter having the special values enables the slice security feature in the UE for Kseaf and/or Kamf derivation.

In some embodiments, the primary UE security context includes a CSEAF key (i.e., Kcseaf). In such embodiments, the processor derives the Kcseaf includes using the Kausf as an input key and using at least one of the following input values: FC, SNN, length of SNN, the ABBA parameter having the special value, length of the ABBA parameter, SUPI, length of SUPI, Usage Type='Serving Network Master Key.' and Length of Usage Type. In certain embodiments, the processor derives the new Kamf from the primary UE security context includes using the Kcseaf as an input key and using at least one of the following input values: SUPI, length of SUPI, special ABBA parameter, length of special ABBA parameter, N-NSCI, and Length of N-NSCI.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to security context handling during AMF reallocation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
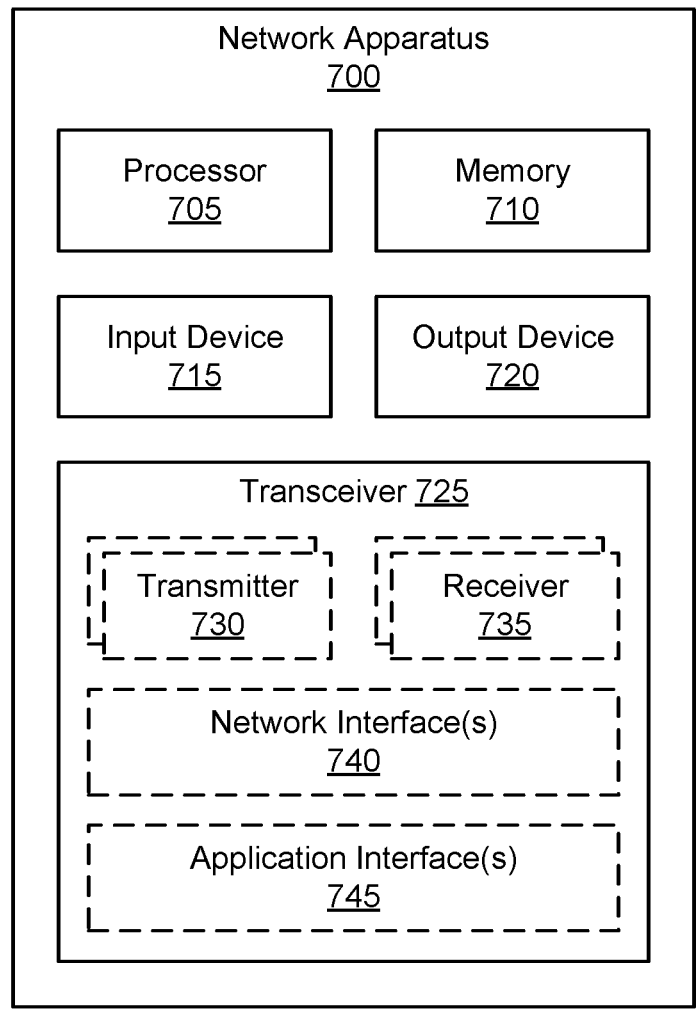
FIG. 7 is a diagram illustrating one embodiment of a network apparatus that may be used for security context handling during AMF reallocation.

FIG. 7 depicts a network apparatus 700 that may be used for security context handling during AMF reallocation, according to embodiments of the disclosure. In one embodiment, network apparatus 700 may be one implementation of a RAN node, such as the base unit 121, the RAN node 210, or gNB, described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that sends UE configurations and receives measurement reports, as described herein. In such embodiments, the processor 705 controls the network apparatus 700 to perform the above described behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 controls the network apparatus 700 to perform the above described Common NF/CSEAF behaviors. As discussed above the Common NF may be implemented by the CSEAF 134, the AUSF 136, the NSSF 137, the NRF 138, or another well-connected NF. In various embodiments, the processor 705 derives a Reroute Security Context, a Key Set Identifier and derives a first authentication parameter (e.g., NAS_Sec_ID) for authenticating a Target AMF. Here, the Reroute Security Context contains at least an integrity key (i.e., Knasint') for Reroute NAS integrity protection and an encryption key (i.e., Knasenc) for Reroute NAS ciphering protection. Note that the Reroute Security Context may be derived from a first key associated to the Common NF (i.e., a key configured and/or available in the AUSF, NSSF, NRF, CSEAF, etc.

The network interface 740 receives a Key Request message (e.g., NAS Key Request) from the Target AMF following an AMF reallocation during a UE Registration procedure and the processor 705 verifies the Key Request message by determining whether the second authentication parameter matches the first authentication parameter derived for authenticating the Target AMF. Here, the Key Request message includes at least one of: a UE identifier (e.g., SUCI and/or 5G-GUTI), Target AMF information (e.g., AMF Set ID, AMF ID, and/or AMF NSI ID), a second authentication parameter and a Reroute Key indication.

The processor 705 derives a new security context (e.g., Kseaf or Kamf) for the Target AMF and its co-located SEAF in response to successfully verifying the Key Request message and the network interface 740 sends a Key Response message to the Target AMF/SEAF. Here, the new security context is derived from a primary UE security context (e.g., Kseaf, Kausf, and/or Kcseaf). For example, the key derivation may be as described above where the Kcseaf/Kausf and/or Kseaf is used as the input key with additional inputs to the key derivation function may include one or more of: a SUPI associated with the UE, a length of SUPI, an ABBA parameter having a special value (i.e., a slice specific isolation feature). Moreover, the Key Response message includes at least one of: the new security context (e.g., Kseaf or Kamf), a SUPI associated with the UE identifier, an ABBA parameter having a special value (i.e., a slice specific isolation feature) and a N-NSCI.

In some embodiments, the Key Request message further contains a Reroute Key Indication, and the Key Response message further contains the Reroute Security Context. In some embodiments, the network interface 740 receives a Security Context request message from an initial AMF/SEAF during the UE Registration procedure and prior to receiving the Key Request message. Here, the Security Context request message includes at least one of: Target AMF Information (e.g., T-AMF ID, T-AMF NSI ID, and/or T-AMF Set ID), a User Subscription Identifier(s) (e.g., SUCI, SUPI, and/or 5G-GUTI), a Reroute Security Required Indication, and a first KSI (e.g., ng-KSI).

In such embodiments, the processor 705 generates the Reroute Security Context in response to the Reroute Security Required indication being a positive indication. Here, the integrity key is derived from a first key associated with the network function and the encryption key is derived from the first key. Moreover, the Reroute integrity key is derived using as additional input at least one of the following: Target AMF ("T-AMF") information (e.g., T-AMF ID, T-AMF NSI ID, and/or T-AMF Set ID), SUPI, S-NSSAI (or other slice information), Usage type (e.g., 'NAS Container Integrity') and lengths of each inputs. The Reroute encryption key is derived using as additional input at least one of the following: Target AMF information (e.g., T-AMF ID, T-AMF NSI ID, and/or T-AMF Set ID), SUPI, S-NSSAI (or other slice information), Usage type (e.g., 'NAS Container confidentiality'), and lengths of each inputs.

The processor 705 derives the authentication parameter using at least one of: the integrity key, the encryption key, the User Subscription Identifier, the Target AMF Information, and the first Key, storing the derived Reroute Security context, the User Subscription Identifier(s), and/or the authentication parameter in local memory, and the network interface 740 sends a Security Context response message to the initial AMF/SEAF. Here, the Security Context response message contains the authentication parameter. In certain embodiments, the Security Context response message further contains the Reroute Security Context in response to the Reroute Security Required indication being a positive indication. In other embodiments, the Security Context response message does not include the Reroute Security Context in response to the Reroute Security Required indication being negative (or if not present/received).

In some embodiments, the User Subscription Identifier(s) include at least one of: a SUCI, a 5G-GUTI and the SUPI. In such embodiments, the processor 705 determines whether the SUCI, 5G-GUTI and/or the SUPI is stored in local memory and considering a User Equipment ("UE") corresponding to the SUCI, 5G-GUTI and/or SUPI as already authenticated in response to determining that the SUCI, 5G-GUTI and/or SUPI is stored in the local memory. Moreover, the processor 705 may retrieve (i.e., from local memory) a valid Primary UE security context (e.g., Kcseaf, Kausf, and/or Kseaf) related to at least one of: the authentication parameter (e.g., NAS_Sec_ID), User Subscription Identifier and/or KSI in the first Security Context request message in response to determining that the SUCI, 5G-GUTI and/or the SUPI is stored in the local memory.

In some embodiments, the network interface 740 receives a UE Authenticate Request message from the initial AMF (e.g., directly or via a co-located SEAF) during the UE initial Registration procedure and forwards the UE Authenticate Request message to an AUSF. Here, the UE authenticate Request message may include the SUCI of the UE and a SNN.

In certain embodiments, the network interface 740 further receives a UE Authenticate Response message from the AUSF, where the UE Authenticate Response message includes a SUPI and the Primary UE security context (e.g., containing Kseaf, Kcseaf, Kausf). In such embodiments, the processor 705 may store the received SUPI, the Primary UE security context, and the KSI, where the KSI is a locally assigned value that identifies the Primary UE security context. Via the network interface 740, the processor 705 sends the Kseaf to a SEAF co-located with the initial AMF (e.g., in a UE authentication response message).

In some embodiments, the ABBA parameter having the special value indicates a network slice-specific feature where a new SEAF key (i.e., Kseaf) and an AMF key (i.e., Kamf) are to be derived from the Primary UE security context (e.g., Kausf and/or Kseaf) to adhere to slice security and isolation requirements between the initial AMF and the target AMF. In such embodiments, the processor 705 derives the new Kseaf by using the Kausf as an input key and using at least one of the following input values: the ABBA parameter having the special value, length of the ABBA parameter, Usage Type='Slice/Service Information/AMF Set/default', and Length of Usage Type. Further, the processor 705 may derive the new Kamf from the primary UE security context by using the derived new Kseaf as an input key and using at least one of the following input values: SUPI, length of SUPI, special ABBA parameter, length of special ABBA parameter, N-NSCI, and Length of N-NSCI.

In some embodiments, the Primary UE security context is not specific to any network slice (i.e., is slice agnostic). Accordingly, the common network function controls the provisioning of UE security context transfer to other network functions (e.g., AMF/SEAF or other NF) based on the network slice security, service and isolation requirements and local policy configured by the operator. In various embodiments, the common NF in the core network is an AUSF, an NSSF, an NRF, a CSEAF, a SEMF, and/or a SECF.

In some embodiments, the Primary UE security context received in the UE Authenticate Response contains an AUSF key ("Kausf") and does not contain a Security Anchor Function ("SEAF") key ("Kseaf"). Accordingly, the processor 705 may derive the Kseaf from the Kausf. In certain embodiments, the processor 705 derives the Kseaf by using the Kausf as an input key and using at least one of the following input values: FC value, SNN, a length of the SNN, Usage Type parameter, and a length of the Usage Type parameter, where the Usage Type parameter comprises the string 'Slice/Service Information/AMF Set/default'. Note that the input FC is a value (i.e., number) from a number space. The FC value may be used to distinguish between different instances of the algorithm. In further embodiments, the processor 705 may derive the Kseaf by using the Kausf as an input key and using at least one of the following input values: SNN, length of SNN, Slice information, and length of Slice information.

In certain embodiments, the Primary UE security context received in the UE Authenticate Response contains a SEAF key (i.e., Kseaf) and does not contain a Kausf. In such embodiments, the processor 705 stores the received Kseaf to local memory and derives an AMF key (i.e., Kamf) from the Kseaf. Additionally, the processor 705 provides the Kamf to the initial AMF in a UE authenticate response message.

In various embodiments, the processor 705 controls the network apparatus 700 to perform the above described initial AMF/SEAF behaviors. For example, the network interface 740 may send a Security Context request message to a common NF during a UE Registration procedure. Note that the processor 705 may trigger the Security Context request message in response to determining to perform AMF reallocation and reroute via RAN. Here, the Security Context request message includes at least one of the following: Target AMF Information (e.g., AMF ID, AMF NSI ID and/or AMF Set ID), User Subscription Identifier(s) (e.g., SUCI, SUPI, and/or 5G-GUTI), and a KSI (e.g., ngKSI). In one embodiment, the Security Context request message is Nnf_AMFRealloc_SecurityContext Request that uses a service-based interface between the common NF and the AMF/SEAF, where 'nf' in 'Nnf' is replaced with the name of the common NF (e.g., AUSF, NSSF, NRF, CSEAF, SEMF, SECF, etc.)

Note that the AMF Identifier ("ID") may be constructed from an AMF Region ID, an AMF Set ID and an AMF Pointer. In one embodiment, the AMF ID has the format AMF Region ID|AMF Set ID|AMF Pointer, where the symbol '|' indicates concatenation. In one embodiment, the AMF Region ID is 8-bits in length, the AMF Set ID is 10 bits in length, and the AMF Pointer is 6-bits in length. In such embodiments, the AMF ID would be a 24-bit ID.

The network interface 740 receives a Security Context response message from the common NF, where the Security Context response message contains an authentication parameter (e.g., NAS_Sec_ID). Via the network interface 740, the processor 705 sends a Reroute NAS message with NAS protection (e.g., with integrity and ciphering protection) to a RAN node in response to determining to perform AMF reallocation and reroute via RAN. Here, the Reroute NAS message contains at least one cleartext IE (e.g., ngKSI, SUCI, Reroute Security Information). In one embodiment, the Security Context request message is Nnf_AMFRealloc_Security Context Response that uses a service-based interface between the common NF and the AMF/SEAF, where 'nf' in 'Nnf' is replaced with the name of the common NF (e.g., AUSF, NSSF, NRF, CSEAF, SEMF, SECF, etc.)

In some embodiments, the Security Context request message further contains a Reroute Security Required Indication, and the Security Context response message further contains a Reroute Security Context in response to the Security Context request message containing the Reroute Security Required Indication. In some embodiments, the Reroute Security Context contains at least an integrity key (i.e., Knasint) for Reroute NAS integrity and an encryption key (i.e., Knasenc') for Reroute NAS ciphering. In certain embodiments, the Reroute NAS message contains a protected NAS container that is protected using the Reroute Security Context.

In certain embodiments, the processor 705 determines to include the protected NAS container in the Reroute NAS message in response to the initial AMF having one of: a complete initial UE message and NAS security information. In such embodiments, the protected NAS container contains at least one of: the User Subscriber Identifier (e.g., SUPI), the complete UE initial message, the NAS security information, and Reroute Security Information. In certain embodiments, the Security Context request message contains the Reroute Security Required Indication in response to the initial AMF having received a complete initial UE message.

In some embodiments, the at least one cleartext IE comprises at least one of: UE Security Capabilities, the User Subscription Identifier (e.g., SUCI and/or 5G-GUTI), the KSI, the Authentication parameter, and an ABBA parameter having a special value. In some embodiments, the Reroute NAS message comprises Reroute Security Information, the Reroute Security information comprising at least one of: the received authentication parameter, an ABBA parameter having a special value (i.e., slice isolation specific value), and Security Algorithm identities used for Reroute NAS integrity and ciphering protection.

In some embodiments, the processor 705 controls the network interface 740 to send a UE authentication request message to the Common NF (e.g., CSEAF, AUSF) during an initial UE registration procedure and receiving a UE authentication response message from the Common NF (alternatively, receiving via an SEAF) in response to the UE authentication request message. In such embodiments, the UE authentication request message includes a User Subscription Identifier (e.g., SUCI and/or SUPI) and SNN and the UE authentication response message includes: an authentication result, an ABBA parameter having a special value, a KSI, and a first key (e.g., Kseaf and/or Kamf).

The processor 705 stores the authentication result, the ABBA parameter having the special value, the KSI and the first key to local memory. In certain embodiments, the first key comprises a SEAF key (i.e., Kseaf). In such embodiments, the Kseaf is sent in response to the initial AMF having a co-located SEAF. In certain embodiments, the first key comprises an AMF key (i.e., Kamf). In such embodiments, the Kamf is sent in response to the initial AMF not having a co-located SEAF.

In some embodiments, the processor 705 controls the network interface 740 to send a NAS Security mode command message to the UE and receiving a NAS Security mode complete message. Here, the NAS Security mode command message includes the ABBA parameter having the special value (i.e., a slice specific isolation feature). In such embodiments, the processor 705 verifies the NAS Security mode complete message using a NAS security context and locally stores the ABBA parameter having the special value in response to successful verification of the NAS Security mode complete message.

In various embodiments, the processor 705 controls the network apparatus 700 to perform the above described Target AMF/SEAF behaviors. For example, the network interface 740 may receive a Reroute NAS message for a UE (e.g., containing an initial UE message or a Registration Request), where an N14 interface with an initial AMF is not supported. Here, the Reroute NAS message contains at least one of: a User Subscription Identifier (e.g., SUCI and/or 5G-GUTI) of a UE, a KSI (e.g., ngKSI) and an authentication parameter. In one embodiment, the Reroute NAS message also includes NAS Security algorithms. The processor 705 determines to fetch a Reroute NAS Security Context based on the authentication parameter. Via the network interface 740, the processor 705 sends a Key Request (e.g., NAS Key Request) message to a common NF. Here, the Key Request message includes at least one of: the authentication parameter, AMF information (e.g., AMF ID, AMF NSI ID, AMF Set ID), a Reroute Key Indicator and the KSI. In certain embodiments, the Key Request message includes the User Subscription Identifier (e.g., the SUCI or 5G-GUTI).

The network interface 740 receives a Key Response message from the common NF to the Target AMF, where the Key Response message includes at least one of: a SUPI related to the received User Subscription Identifier, a N-NSCI, an ABBA parameter having a special value, a new security context (e.g., Kseaf and/or Kamf), and a Reroute NAS Security Context containing at least an integrity key for Reroute NAS integrity verification and an encryption key for Reroute NAS de-ciphering. Here, the new security context is derived from a primary UE security context (e.g., including keys Kcseaf, Kseaf, and/or Kausf). Note that the Reroute Security Context may be derived from a first key associated to the Common NF (i.e., a key configured and/or available in the AUSF, NSSF, NRF, CSEAF, etc.).

In some embodiments, the processor 705 sends a NAS Security mode command message to the UE via the network interface 740 and receives a NAS Security mode complete message from the UE. Here, the NAS Security mode command message includes at least one of the following: the N-NSCI, the ABBA parameter having the special value, and the KSI, and where the NAS Security mode complete message includes a N-NSCI Acknowledgement. In such embodiments, the processor 705 verifies the received NAS Security mode complete message by using NAS integrity and ciphering keys derived from a new Kamf which is associated to the N-NSCI in response to receiving N-NSCI Acknowledgement. Moreover, in response to successful verification of the NAS Security mode complete message, the processor 705 stores to local memory at least the KSI and the ABBA parameter having the special value.

In certain embodiments, the ABBA parameter in the NAS Security mode command message has a value specific to network slicing, slice isolation, and AMF reallocation. Here, the ABBA parameter having the specific value enables the slice security feature in the UE for new SEAF key (i.e., Kseaf) derivation and corresponding AMF key (i.e., Kamf) derivation. In certain embodiments, the N-NSCI in the NAS security mode command message indicates to the UE to derive a new NAS security context from the new Kseaf and to rekey the Kamf to align the new NAS security derived at UE with the Reroute NAS security context available in the Target AMF.

In some embodiments, the Reroute NAS message comprises at least one cleartext IE and a protected NAS container. In such embodiments, determining to fetch the Reroute NAS security context is further based on the received NAS container. In certain embodiments, the processor 705 performs integrity verification and deciphering of the protected NAS container using the Reroute security context.

In such embodiments, the at least one cleartext IE includes at least one of: UE Security Capabilities, the User Subscription Identifier, the KSI, the Authentication parameter (e.g., NAS_Sec_ID), and the ABBA parameter having the special value. In certain embodiments, the Reroute NAS message contains Reroute Security Information, where the Reroute Security information includes at least one of: the received authentication parameter, the ABBA parameter having the special value, and Security Algorithm identities used for Reroute NAS integrity and ciphering protection.

In some embodiments, direct UE identification is required when the N14 interface is not supported. In such embodiments, the processor 705 controls the network interface 740 to send an Identity Request to the UE and receive an Identity Request from UE, where the Identity Request contains the SUCI belonging to the UE.

In various embodiments, the processor 705 controls the network apparatus 700 to perform the above described AUSF behaviors. For example, the network interface 740 may receive a UE Authenticate Request message from a common network function (e.g., the CSEAF/SEMF/SECF) during a UE registration procedure. Here, the UE Authenticate Request message includes a User Subscriber Identifier (e.g., SUCI and/or SUPI) and an SNN. The processor 705 derives a primary UE security context (e.g., Kcseaf and/or Kseaf) in response to successful UE authentication, where the primary UE security context includes a first key that is derived from an AUSF Key (i.e., Kausf). Via the network interface 740, the processor 705 sends a UE authenticate Response message to the common network function, where the UE authenticate Response message includes an authentication result, a SUPI, and the primary UE security context.

In certain embodiments, deriving the primary UE security context further includes deriving a SEAF key (i.e., Kseaf) in response to the mobile communication network deploying a SEAF co-located with an AMF. In such embodiments, the processor 705 derives the Kseaf by using the Kcseaf as an input key and using at least one of the following input values: FC value, SNN, a length of the SNN, Usage Type parameter, and a length of the Usage Type parameter, where the Usage Type parameter contains the string 'Slice/Service Information/AMF Set/default'.

In some embodiments, the first key is a CSEAF key (i.e., Kcseaf). In such embodiments, the processor 705 derives the Kcseaf by using the Kausf as an input key and using at least one of the following input values: FC, SNN, length of SNN, SUPI, length of SUPI, a Usage Type parameter, and a length of Usage Type parameter, where the Usage Type parameter contains the string 'Serving Network Master Key'. In certain embodiments, the primary UE security context sent in the UE authenticate Response message contains only the Kcseaf in response to the processor 705 determining to send a single primary security context. In certain embodiments, the primary UE security context sent in the UE authenticate Response message contains only the Kcseaf in response to the fourth apparatus being configured to send only one serving network key.

In some embodiments, the first key is a SEAF key (i.e., Kseaf). In such embodiments, the processor 705 derives the Kseaf by using the Kcseaf as an input key and using at least one of the following input values: FC value, SNN, a length of the SNN, Usage Type parameter, and a length of the Usage Type parameter, where the Usage Type parameter contains the string 'Slice/Service Information/AMF Set/default'. In certain embodiments, the primary UE security context sent in the UE authenticate Response message comprises only the Kseaf in response to the processor 705 determining to send a single primary security context. In certain embodiments, the primary UE security context sent in the UE authenticate Response message comprises only the Kseaf in response to the fourth apparatus being configured to send only one serving network key.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to security context handling during AMF reallocation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
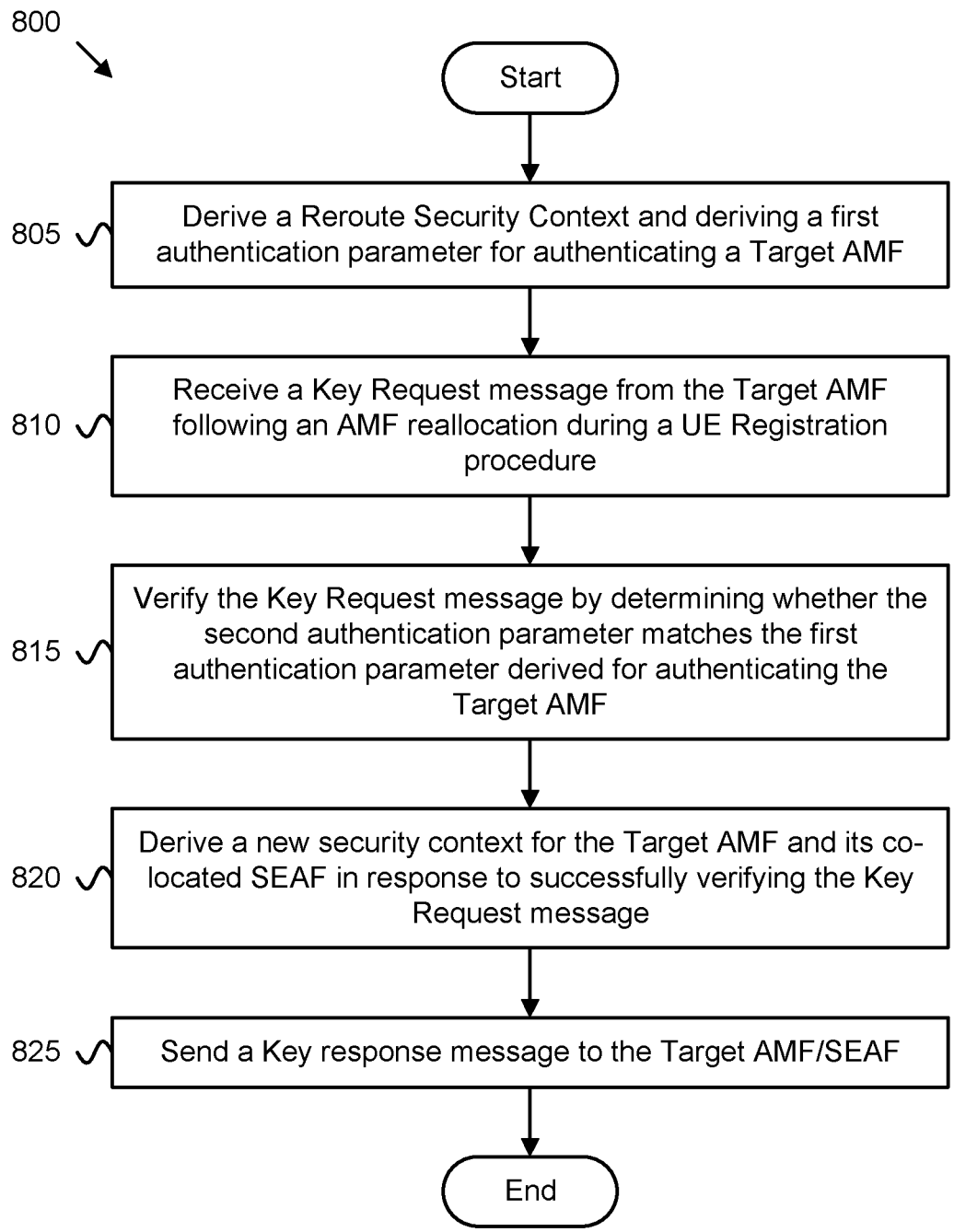
FIG. 8 is a flowchart diagram illustrating one embodiment of a first method security context handling during AMF reallocation.

FIG. 8 depicts one embodiment of a method 800 for security context handling during AMF reallocation, according to embodiments of the disclosure. In various embodiments, the method 800 is performed by a common Network Function, such as the CSEAF 134, the AUSF 136, the NSSF 137, the NRF 138, and/or the network apparatus 700, described above. In some embodiments, the method 800 is performed by a processor, such as a microcontroller, a microprocessor, a CPU, a GPU, an auxiliary processing unit, a FPGA, or the like.

The method 800 begins and derives 805 a Reroute Security Context and deriving a first authentication parameter for authenticating a Target AMF. Here, the Reroute Security Context contains at least an integrity key for Reroute NAS integrity protection and an encryption key for Reroute NAS ciphering protection. Note that the Reroute Security Context may be derived from a first key associated to the Common NF (i.e., a key configured and/or available in the AUSF, NSSF, NRF. CSEAF, etc.). The method 800 includes receiving 810 a Key Request message from the Target AMF following an AMF reallocation during a UE Registration procedure. In one embodiment, the UE registration procedure is an Initial Registration procedure. In another embodiment, the UE registration procedure is a Mobility Registration Update procedure.

The method 800 includes verifying 815 the Key Request message by determining whether the second authentication parameter matches the first authentication parameter derived for authenticating the Target AMF. Here, the Key Request message includes at least one of: a UE identifier, Target AMF information, a second authentication parameter and a Reroute Key indication. The method 800 includes deriving 820 a new security context for the Target AMF and its co-located SEAF in response to successfully verifying the Key Request message. The method 800 includes sending 825 a Key Response message to the Target AMF/SEAF. Here, the new security context is derived from a primary UE security context (e.g., Kseaf, Kausf, and/or Kcseaf). For example, the key derivation may be as described above where the Kcseaf/Kausf and/or Kseaf is used as the input key with additional inputs to the key derivation function may include one or more of: a SUPI associated with the UE, a length of SUPI, an ABBA parameter having a special value (i.e., a slice specific isolation feature). Moreover, the Key Response message includes at least one of: the new security context, Reroute Security Context (i.e., if a Reroute Key indication is received), a SUPI associated with the UE identifier, an ABBA parameter having a special value and a N-NSCI. The method 800 ends.

Figure 9:
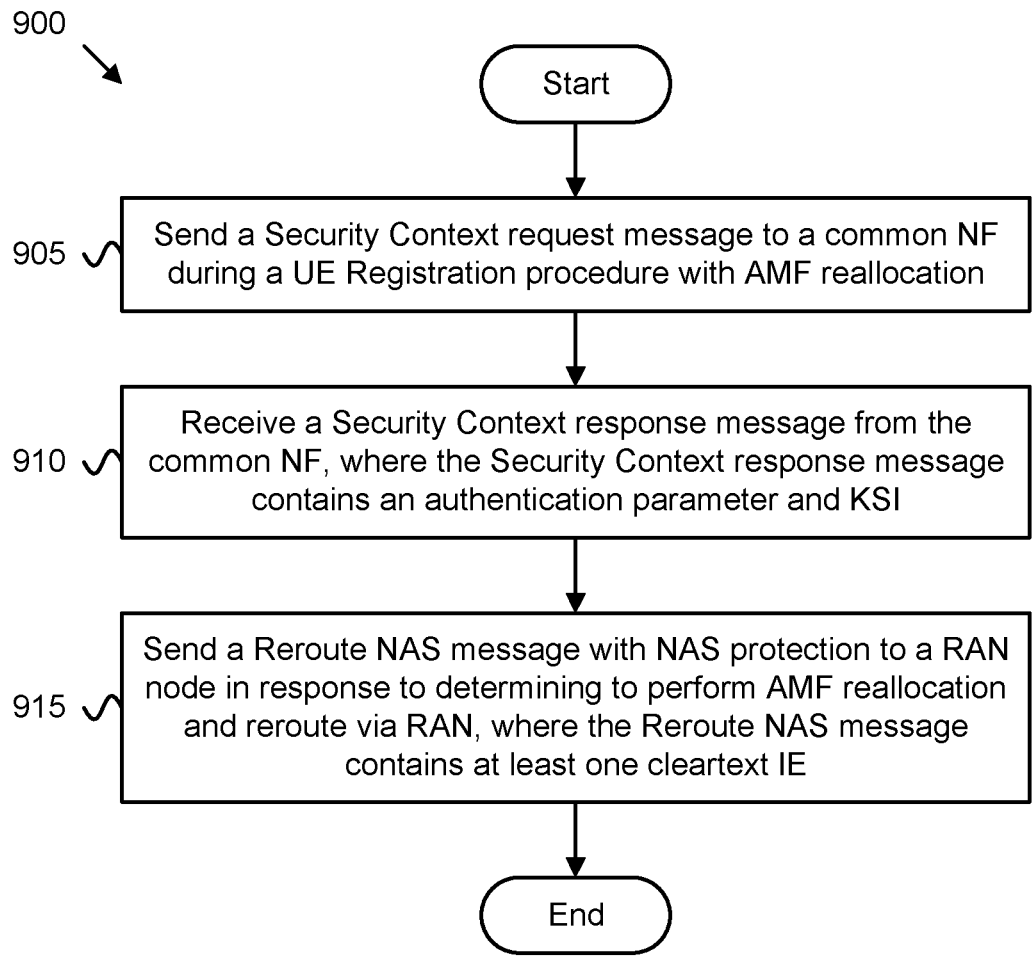
FIG. 9 is a flowchart diagram illustrating one embodiment of a second method security context handling during AMF reallocation.

FIG. 9 depicts one embodiment of a method 900 for security context handling during AMF reallocation, according to embodiments of the disclosure. In various embodiments, the method 900 is performed by an initial AMF having a co-located SEAF, such as the AMF 131, the Initial AMF/SEAF 301, and/or the network apparatus 700, described above. In some embodiments, the method 900 is performed by a processor, such as a microcontroller, a microprocessor, a CPU, a GPU, an auxiliary processing unit, a FPGA, or the like.

The method 900 begins and sends 905 a Security Context request message to a common NF during a UE Registration procedure with AMF reallocation, where the Security Context request message includes at least one of the following: Target AMF Information, a User Subscription Identifier (e.g., SUPI and SUCI/5G-GUTI), Key Request Indicator and a KSI. The method 900 includes receiving 910 a Security Context response message from the common NF, where the Security Context response message contains an authentication parameter and a KSI. In certain embodiments, the Security Context response message contains a Reroute Security Context. The method 900 also includes sending 915 a Reroute NAS message with NAS protection to a RAN node in response to determining to perform AMF reallocation and reroute via RAN, where the Reroute NAS message contains at least one cleartext IE. The method 900 ends.

Figure 10:
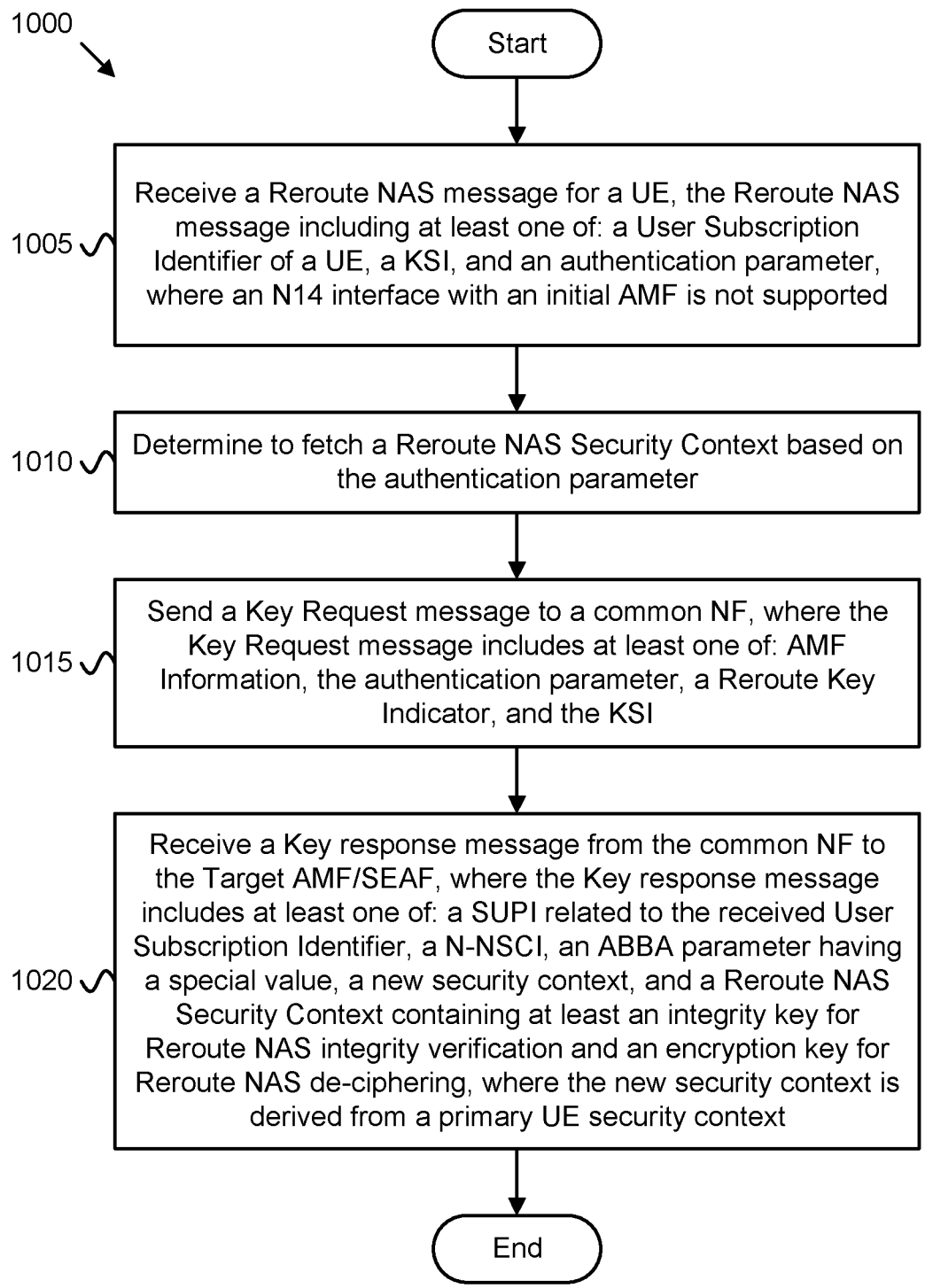
FIG. 10 is a flowchart diagram illustrating one embodiment of a third method security context handling during AMF reallocation.

FIG. 10 depicts one embodiment of a method 1000 for security context handling during AMF reallocation, according to embodiments of the disclosure. In various embodiments, the method 1000 is performed by a target AMF having a co-located SEAF, such as the AMF 131, the Target AMF/SEAF 401, and/or the network apparatus 700, described above. In some embodiments, the method 1000 is performed by a processor, such as a microcontroller, a microprocessor, a CPU, a GPU, an auxiliary processing unit, a FPGA, or the like.

The method 1000 begins and receives 1005 a Reroute NAS message for a UE, the Reroute NAS message including at least one of: a User Subscription Identifier of a UE (e.g., SUCI or 5G-GUTI), a KSI, and an authentication parameter, where an N14 interface with an initial AMF is not supported. In some embodiments, the Reroute NAS message also includes one or more of: NAS Security algorithms, an ABBA parameter having the special value dedicated for Slice specific security feature, NAS security algorithm identifiers, Reroute Security Information, and/or NAS security information. The method 1000 includes determining 1010 to fetch a Reroute NAS Security Context based on the authentication parameter. The method includes sending 1015 a Key Request message to a common NF, where the Key Request message includes at least one of: the authentication parameter, AMF information (e.g., AMF ID, AMF NSI ID, AMF Set ID), a Reroute Key Indicator, and the KSI. In certain embodiments, the Key Request message includes the User Subscription Identifier (e.g., the SUCI or 5G-GUTI).

The method 1000 includes receiving 1020 a Key Response message from the common NF to the Target AMF/SEAF, where the Key Response message includes at least one of: a SUPI related to the received User Subscription Identifier, a N-NSCI, an ABBA parameter having the special value, a new security context, and a Reroute NAS Security Context containing at least an integrity key for Reroute NAS integrity verification and an encryption key for Reroute NAS de-ciphering, where the new security context is derived from a primary UE security context. The method 1000 ends.

Figure 11:
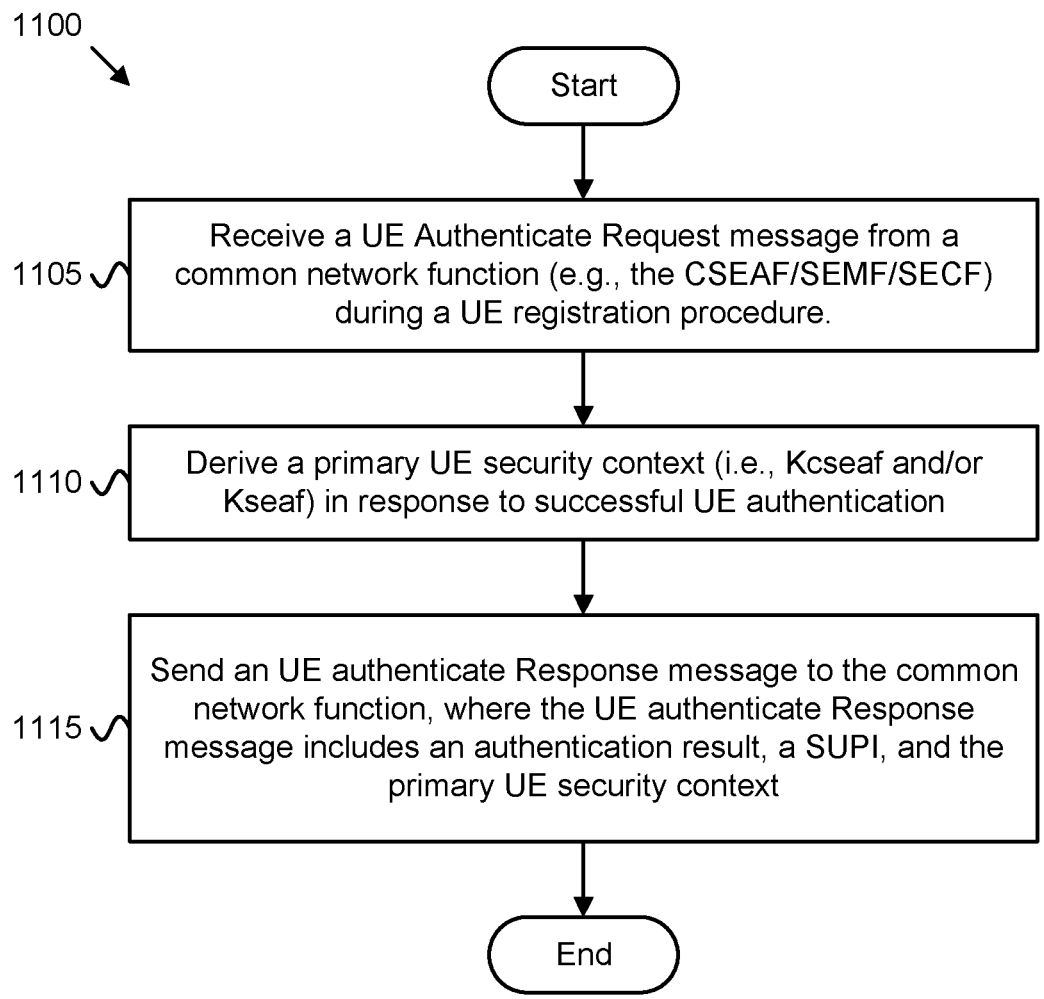
FIG. 11 is a flowchart diagram illustrating one embodiment of a fourth method security context handling during AMF reallocation.

FIG. 11 depicts one embodiment of a method 1100 for security context handling during AMF reallocation, according to embodiments of the disclosure. In various embodiments, the method 1100 is performed by an AUSF in a mobile communication network, such as the AUSF 136, the AUSF 305, and/or the network apparatus 700, described above. In some embodiments, the method 1100 is performed by a processor, such as a microcontroller, a microprocessor, a CPU, a GPU, an auxiliary processing unit, a FPGA, or the like.

The method 1100 begins and receives 1105 a UE Authenticate Request message from a common network function (e.g., the CSEAF/SEMF/SECF) during a UE registration procedure. Here, the UE authenticate Request message includes a User Subscriber Identifier (e.g., SUCI and/or SUPI) and an SNN. The method 1100 includes deriving 1110 a primary UE security context (e.g., containing Kcseaf and/or Kseaf) in response to successful UE authentication, where the primary UE security context includes a first key that is derived from an AUSF Key (i.e., Kausf). The method 1100 includes sending 1115 a UE authenticate Response message to the common network function, where the UE authenticate Response message includes an authentication result, a Subscriber Permanent Identity ("SUPI"), and the primary UE security context. The method 1100 ends.

Figure 12:
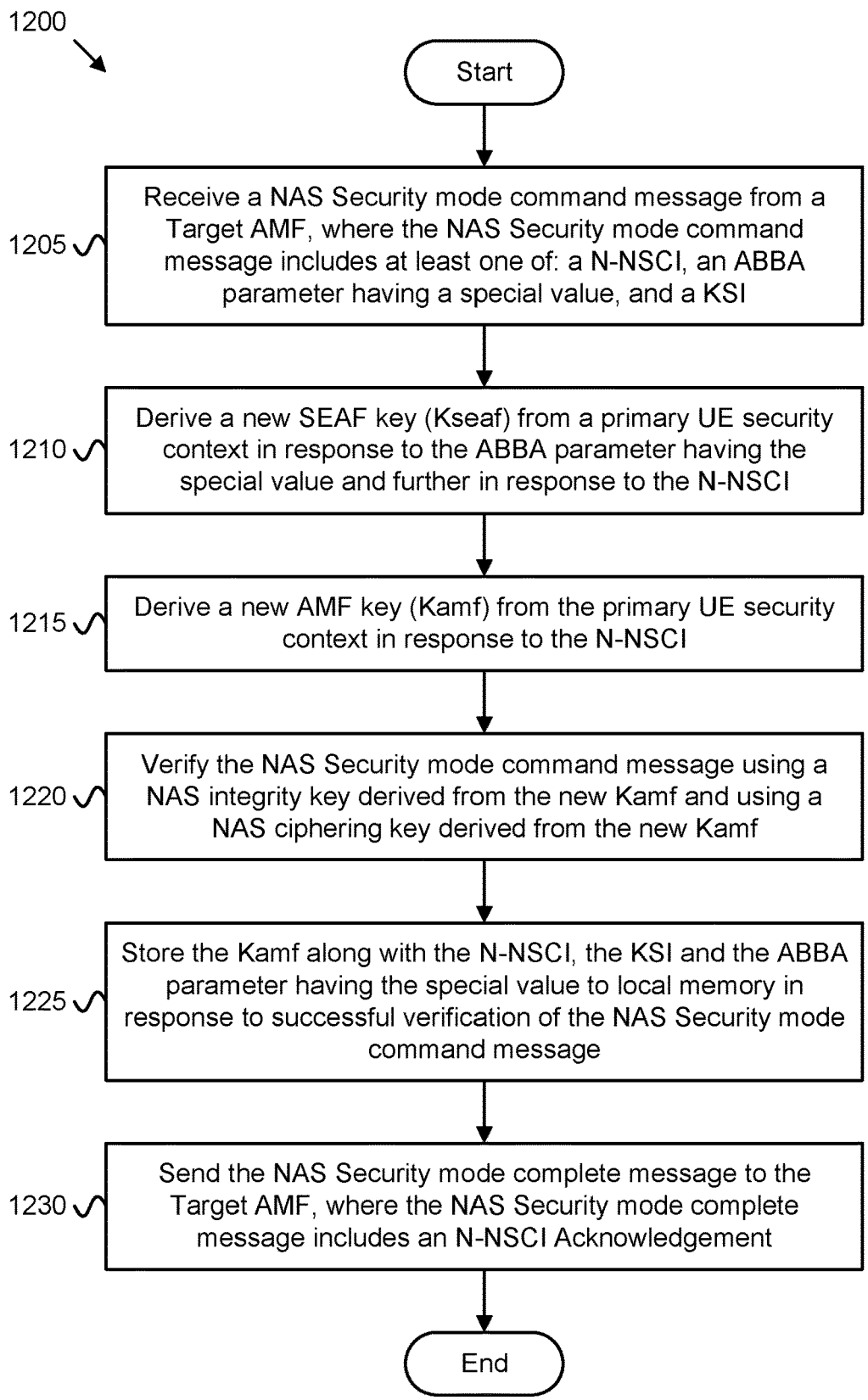
FIG. 12 is a flowchart diagram illustrating one embodiment of a fifth method security context handling during AMF reallocation.

FIG. 12 depicts one embodiment of a method 1200 for security context handling during AMF reallocation, according to embodiments of the disclosure. In various embodiments, the method 1200 is performed by a user equipment device in a mobile communication network, such as the remote unit 105, the UE 205, and/or the user equipment apparatus 600, described above. In some embodiments, the method 1200 is performed by a processor, such as a microcontroller, a microprocessor, a CPU, a GPU, an auxiliary processing unit, a FPGA, or the like.

The method 1200 begins and receives 1205 a NAS Security mode command message from a Target AMF, where the NAS Security mode command message includes at least one of: a N-NSCI, an ABBA parameter having a special value, and a KSI. The method 1210 includes deriving a new SEAF key (i.e., Kseaf) from a primary UE security context (e.g., from Kausf) in response to the ABBA parameter having the special value and further in response to the N-NSCI. The method 1200 includes deriving 1215 a new AMF key ("Kamf") from the primary UE security context (e.g., from the new Kseaf) in response to the N-NSCI.

The method 1200 includes verifying 1220 the NAS Security mode command message using a NAS integrity key derived from the new Kamf and using a NAS ciphering key derived from the new Kamf. The method 1200 includes storing 1225 the Kamf along with the N-NSCI, the KSI and the ABBA parameter having the special value to local memory in response to successful verification of the NAS Security mode command message. The method 1200 includes sending 1230 the NAS Security mode complete message to the Target AMF, where the NAS Security mode complete message includes an N-NSCI Acknowledgement. The method 1200 ends.

Disclosed herein is a first apparatus for security context handling during AMF reallocation, according to embodiments of the disclosure. The first apparatus may be implemented by a network function in a mobile communication network, such as the CSEAF 134, the AUSF 136, the NSSF 137, the NRF 138, and/or the network apparatus 700, described above. The first apparatus includes a network interface and a processor that derives a Reroute Security Context and derives a first authentication parameter (e.g., NAS_Sec_ID) for authenticating a Target AMF. Here, the Reroute Security Context containing at least an integrity key (i.e., Knasint) for Reroute NAS integrity protection and an encryption key (i.e., Knasenc') for Reroute NAS ciphering protection.

The network interface receives a Key Request message (e.g., NAS Key Request) from the Target AMF following an AMF reallocation during a UE Registration procedure and the processor verifies the Key Request message by determining whether the second authentication parameter matches the first authentication parameter derived for authenticating the Target AMF. Here, the Key Request message includes at least one of: a UE identifier (e.g., SUCI and/or 5G-GUTI), Target AMF information (e.g., AMF Set ID, AMF ID, and/or AMF NSI ID), a second authentication parameter and a Reroute Key indication.

The processor derives a new security context (e.g., Kseaf or Kamf) for the Target AMF and its co-located SEAF in response to successfully verifying the Key Request message and the network interface sends a Key Response message to the Target AMF/SEAF. Here, the new security context is derived from a primary UE security context (e.g., Kseaf, Kausf, and/or Kcseaf). For example, the key derivation may be as described above where the Kcseaf/Kausf and/or Kseaf is used as the input key with additional inputs to the key derivation function may include one or more of: SUPI, length of SUPI, ABBA parameter having a special value (i.e., a slice specific isolation feature). Moreover, the Key Response message includes at least one of: the new security context (e.g., Kseaf or Kamf), a SUPI associated with the UE identifier, an ABBA parameter having a special value and a N-NSCI.

In some embodiments, the Key Request message further contains a Reroute Key Indication, and the Key Response message further contains the Reroute Security Context. In some embodiments, the network interface 740 receives a Security Context request message from an initial AMF/SEAF during the UE Registration procedure and prior to receiving the Key Request message. Here, the Security Context request message includes at least one of: Target AMF Information (e.g., T-AMF ID, T-AMF NSI ID, and/or T-AMF Set ID), a User Subscription Identifier(s) (e.g., SUCI, SUPI, and/or 5G-GUTI), a Reroute Security Required Indication, and a first KSI (e.g., ng-KSI).

In such embodiments, the processor generates the Reroute Security Context in response to the Reroute Security Required indication being a positive indication. Here, the integrity key is derived from a first key associated with the network function and the encryption key is derived from the first key. Moreover, the Reroute integrity key is derived using as additional input at least one of the following: Target AMF information (e.g., T-AMF ID, T-AMF NSI ID, and/or T-AMF Set ID), SUPI, S-NSSAI (or other slice information), Usage type (e.g., 'NAS Container Integrity') and lengths of each inputs. The Reroute encryption key is derived using as additional input at least one of the following: Target AMF information (e.g., T-AMF ID, T-AMF NSI ID, and/or T-AMF Set ID), SUPI, S-NSSAI (or other slice information), Usage type (i.e., 'NAS Container confidentiality'), and lengths of each inputs.

The processor derives the authentication parameter using at least one of: the integrity key, the encryption key, the User Subscription Identifier, the Target AMF Information, and the first Key, storing the derived Reroute Security context, the User Subscription Identifier(s), and/or the authentication parameter in local memory, and the network interface sends a Security Context response message to the initial AMF/SEAF. Here, the Security Context response message contains the authentication parameter. In certain embodiments, the Security Context response message further contains the Reroute Security Context in response to the Reroute Security Required indication being a positive indication. In other embodiments, the Security Context response message does not include the Reroute Security Context in response to the Reroute Security Required indication being negative.

In some embodiments, the User Subscription Identifier(s) include at least one of: a SUCI, a 5G-GUTI and the SUPI. In such embodiments, the processor determines whether the SUCI, 5G-GUTI and/or the SUPI is stored in local memory and considering a User Equipment ("UE") corresponding to the SUCI, 5G-GUTI and/or SUPI as already authenticated in response to determining that the SUCI, 5G-GUTI and/or SUPI is stored in the local memory. Moreover, the processor may retrieve (i.e., from local memory) a valid Primary UE security context (e.g., Kcseaf, Kausf, and/or Kseaf) related to at least one of: the authentication parameter (e.g., NAS_Sec_ID), User Subscription Identifier and/or KSI in the first Security Context request message in response to determining that the SUCI, 5G-GUTI and/or the SUPI is stored in the local memory.

In some embodiments, the network interface receives a UE Authenticate Request message from the initial AMF (e.g., directly or via a co-located SEAF) during the UE initial Registration procedure and forwards the UE Authenticate Request message to an AUSF. Here, the UE authenticate Request message may include the SUCI of the UE and a SNN.

In certain embodiments, the network interface further receives a UE Authenticate Response message from the AUSF, where the UE Authenticate Response message includes a SUPI and the Primary UE security context (e.g., containing Kseaf, Kcseaf/Kausf). In such embodiments, the processor may store the received SUPI, the Primary UE security context, and the KSI, where the KSI is a locally assigned value that identifies the Primary UE security context. Via the network interface, the processor sends the Kseaf to a SEAF co-located with the initial AMF (e.g., in a UE authentication response message).

In some embodiments, the ABBA parameter having the special value indicates a network slice-specific feature where a new SEAF key (i.e., Kseaf) and an AMF key (i.e., Kamf) are to be derived from the Primary UE security context (e.g., containing Kausf/Kseaf) to adhere to slice security and isolation requirements between the initial AMF and the target AMF. In such embodiments, the processor derives the new Kseaf by using the Kausf as an input key and using at least one of the following input values: the ABBA parameter having the special value, length of the ABBA parameter, Usage Type='Slice/Service Information/AMF Set/default', and Length of Usage Type. Further, the processor may derive the new Kamf from the primary UE security context by using the derived new Kseaf as an input key and using at least one of the following input values: SUPI, length of SUPI, special ABBA parameter, length of special ABBA parameter, N-NSCI, and Length of N-NSCI.

In some embodiments, the Primary UE security context is not specific to any network slice (i.e., is slice agnostic). Accordingly, the common network function controls the provisioning of UE security context transfer to other network functions (e.g., AMF/SEAF or other NF) based on the network slice security, service and isolation requirements and local policy configured by the operator. In various embodiments, the common NF in the core network is an AUSF, an NSSF, an NRF, a CSEAF, a SEMF, and/or a SECF.

In some embodiments, the Primary UE security context received in the UE Authenticate Response contains an AUSF key ("Kausf") and does not contain a Security Anchor Function ("SEAF") key ("Kseaf"). Accordingly, the processor may derive the Kseaf from the Kausf. In certain embodiments, the processor derives the Kseaf by using the Kausf as an input key and using at least one of the following input values: FC value, SNN, a length of the SNN, Usage Type parameter, and a length of the Usage Type parameter, where the Usage Type parameter comprises the string 'Slice/Service Information/AMF Set/default.' In further embodiments, the processor may derive the Kseaf by using the Kausf as an input key and using at least one of the following input values: SNN, length of SNN, Slice information, and length of Slice information.

In certain embodiments, the Primary UE security context received in the UE Authenticate Response contains a SEAF key (i.e., Kseaf) and does not contain a Kausf. In such embodiments, the processor stores the received Kseaf to local memory and derives an AMF key (i.e., Kamf) from the Kseaf. Additionally, the processor provides the Kamf to the initial AMF in a UE authenticate response message.

Disclosed herein is a first method for security context handling during AMF reallocation, according to embodiments of the disclosure. The first method may be performed by a network function in a mobile communication network, such as the CSEAF 134, the AUSF 136, the NSSF 137, the NRF 138, and/or the network apparatus 700, described above. The first method includes deriving a Reroute Security Context and deriving a first authentication parameter (e.g., NAS_Sec_ID) for authenticating a Target AMF. Here, the Reroute Security Context containing at least an integrity key (i.e., Knasint) for Reroute NAS integrity protection and an encryption key (i.e., Knasenc') for Reroute NAS ciphering protection.

The first method includes receiving a Key Request message (i.e., NAS Key Request) from the Target AMF following an AMF reallocation during a UE Registration procedure and verifying the Key Request message by determining whether the second authentication parameter matches the first authentication parameter derived for authenticating the Target AMF. Here, the Key Request message includes at least one of: a UE identifier (e.g., SUCI and/or 5G-GUTI), Target AMF information (e.g., AMF Set ID, AMF ID, and/or AMF NSI ID), a second authentication parameter and a Reroute Key indication:

The first method includes deriving a new security context (e.g., Kseaf or Kamf) for the Target AMF and its co-located SEAF in response to successfully verifying the Key Request message and sending a Key Response message to the Target AMF/SEAF. Here, the new security context is derived from a primary UE security context (e.g., Kseaf, Kausf, and/or Kcseaf). For example, the key derivation may be as described above where the Kcseaf/Kausf and/or Kseaf is used as the input key with additional inputs to the key derivation function may include one or more of: SUPI, length of SUPI, ABBA parameter having a special value (i.e., a slice specific isolation feature). Moreover, the Key Response message includes at least one of: the new security context (e.g., Kseaf or Kamf), a SUPI associated with the UE identifier, an ABBA parameter having a special value and a N-NSCI.

In some embodiments, the Key Request message further contains a Reroute Key Indication, and the Key Response message further contains the Reroute Security Context. In some embodiments, the first method further includes receiving a Security Context request message from an initial AMF/SEAF during the UE Registration procedure and prior to receiving the Key Request message. Here, the Security Context request message may include at least one of the following: Target AMF Information (e.g., T-AMF ID, T-AMF NSI ID, and/or T-AMF Set ID), a User Subscription Identifier(s) (e.g., SUCI, SUPI, and/or 5G-GUTI), a Reroute Security Required Indication, and a first KSI (e.g., ng-KSI).

In such embodiments, the first method includes generating the Reroute Security Context in response to the Reroute Security Required indication being a positive indication. Here, the integrity key is derived from a first key associated with the network function and the encryption key is derived from the first key. Moreover, the Reroute integrity key is derived using as additional input at least one of the following: Target AMF information/T-AMF-ID/T-AMF-Set ID, SUPI, S-NSSAI/any Slice information, Usage type 'NAS Container Integrity' and lengths of each inputs. The Reroute encryption key is derived using as additional input at least one of the following: Target AMF information/T-AMF-ID/T-AMF-Set ID, SUPI, S-NSSAI/any slice information, Usage type 'NAS Container confidentiality,' and lengths of each inputs.

The first method may include deriving the authentication parameter using at least one of: the integrity key, the encryption key, the User Subscription Identifier, the Target AMF Information, and the first Key, storing the derived Reroute Security context, the User Subscription Identifier(s), and/or the authentication parameter in local memory, and sending a Security Context response message to the initial AMF/SEAF. Here, the Security Context response message contains the authentication parameter. In certain embodiments, the Security Context response message further contains the Reroute Security Context in response to the Reroute Security Required indication being a positive indication. In other embodiments, the Security Context response message does not include the Reroute Security Context in response to the Reroute Security Required indication being negative.

In some embodiments, the User Subscription Identifier(s) include at least one of: a SUCI, a 5G-GUTI and the SUPI. In such embodiments, the first method further includes determining whether the SUCI, 5G-GUTI and/or the SUPI is stored in local memory and considering a User Equipment ("UE") corresponding to the SUCI, 5G-GUTI and/or SUPI as already authenticated in response to determining that the SUCI, 5G-GUTI and/or SUPI is stored in the local memory. Moreover, the first method may include retrieving (i.e., from local memory) a valid Primary UE security context (e.g., Kcseaf, Kausf, and/or Kseaf) related to at least one of: the authentication parameter (e.g., NAS_Sec_ID), User Subscription Identifier and/or KSI in the first Security Context request message in response to determining that the SUCI, 5G-GUTI and/or the SUPI is stored in the local memory.

In some embodiments, the first method includes receiving a UE Authenticate Request message from the initial AMF (e.g., directly or via a co-located SEAF) during the UE initial Registration procedure and forwarding the UE Authenticate Request message to an AUSF. Here, the UE authenticate Request message includes the SUCI of the UE and a SNN.

In certain embodiments, the first method further includes receiving a UE Authenticate Response message from the AUSF, where the UE Authenticate Response message includes a SUPI and the Primary UE security context (e.g., containing Kseaf, Kcseaf/Kausf). The first method additionally includes storing the received SUPI, the Primary UE security context, and the KSI and sending the Kseaf to a SEAF co-located with the initial AMF (e.g., in a UE authentication response message). Here, the KSI is a locally assigned value that identifies the Primary UE security context.

In some embodiments, the ABBA parameter having the special value indicates a network slice-specific feature where a new SEAF key (i.e., Kseaf) and an AMF key (i.e., Kamf) are to be derived from the Primary UE security context (e.g., containing Kausf/Kseaf) to adhere to slice security and isolation requirements between the initial AMF and the target AMF. In certain embodiments, deriving the new Kseaf comprises using the Kausf as an input key and using at least one of the following input values: the ABBA parameter having the special value, length of the ABBA parameter, Usage Type='Slice/Service Information/AMF Set/default,' and Length of Usage Type. In certain embodiments, deriving the new Kamf from the primary UE security context comprises using the derived new Kseaf as an input key and using at least one of the following input values: SUPI, length of SUPI, special ABBA parameter, length of special ABBA parameter, N-NSCI, and Length of N-NSCI.

In some embodiments, the Primary UE security context is not specific to any network slice (i.e., is slice agnostic) and the common network function controls the provisioning of UE security context transfer to other network functions (e.g., AMF/SEAF or other NF) based on the network slice security, service and isolation requirements and local policy configured by the operator. In various embodiments, the common NF in the core network is an AUSF, an NSSF, an NRF, a CSEAF, a SEMF, and/or a SECF.

In some embodiments, the Primary UE security context received in the UE Authenticate Response contains an AUSF key ("Kausf") and does not contain a Security Anchor Function ("SEAF") key ("Kseaf"). In such embodiments, the first method further includes deriving the Kseaf from the Kausf. In certain embodiments, deriving the Kseaf includes using the Kausf as an input key and using at least one of the following input values: FC value, SNN, a length of the SNN, Usage Type parameter, and a length of the Usage Type parameter, where the Usage Type parameter comprises the string 'Slice/Service Information/AMF Set/default.' In further embodiments, deriving the Kseaf includes using the Kausf as an input key and using at least one of the following input values: SNN, length of SNN, Slice information, and length of Slice information.

In certain embodiments, the Primary UE security context received in the UE Authenticate Response contains a SEAF key (i.e., Kseaf) and does not contain a Kausf. In such embodiments, the first method includes storing the received Kseaf to local memory, deriving an AMF key (i.e., Kamf) from the Kseaf, and providing the Kamf to the initial AMF in a UE authenticate response message.

Disclosed herein is a second apparatus for security context handling during AMF reallocation, according to embodiments of the disclosure. The second apparatus may be implemented by an Initial AMF having a co-located SEAF, such as the AMF 131, the Initial AMF/SEAF 301, and/or the network apparatus 700, described above. The second apparatus includes a processor and a network interface that sends a Security Context request message (e.g., Nnf_AMFRealloc_Security Context Request, where 'nf' in 'Nnf' may be replaced with the name of the common NF (e.g., AUSF, NSSF, NRF, CSEAF, SEMF, SECF, etc.)) to a common NF during a UE Registration procedure. Here, the Security Context request message includes at least one of the following: Target AMF Information (e.g., AMF ID, AMF NSI ID and/or AMF Set ID), a User Subscription Identifier (e.g., SUCI, SUPI, and/or 5G-GUTI), and a KSI (e.g., ngKSI).

The network interface receives a Security Context response message (e.g., Nnf_AMFRealloc_Security Context Response, where 'nf' in 'Nnf' may be replaced with the name of the common NF (e.g., AUSF, NSSF, NRF, CSEAF, SEMF, SECF, etc.)) from the common NF, where the Security Context response message contains an authentication parameter (e.g., NAS_Sec_ID). Via the network interface, the processor sends a Reroute NAS message with NAS protection (e.g., with integrity and ciphering protection) to a RAN node in response to determining to perform AMF reallocation and reroute via RAN. Here, the Reroute NAS message contains at least one cleartext IE (e.g., ngKSI, SUCI/5G-GUTI, Reroute Security Information, ABBA parameter, and/or NAS Security Algorithms).

In some embodiments, the Security Context request message further contains a Reroute Security Required Indication, and the Security Context response message further contains a Reroute Security Context in response to the Security Context request message containing the Reroute Security Required Indication. In some embodiments, the Reroute Security Context contains at least an integrity key (i.e., Knasint) for Reroute NAS integrity and an encryption key (i.e., Knasenc') for Reroute NAS ciphering. In certain embodiments, the Reroute NAS message contains a protected NAS container that is protected using the Reroute Security Context.

In certain embodiments, the processor determines to include the protected NAS container in the Reroute NAS message in response to the initial AMF having one of: a complete initial UE message and NAS security information. In such embodiments, the protected NAS container contains at least one of: the User Subscriber Identifier (e.g., SUPI), the complete UE initial message, the NAS security information, and Reroute Security Information. In certain embodiments, the Security Context request message contains the Reroute Security Required Indication in response to the initial AMF having received a complete initial UE message.

In some embodiments, the at least one cleartext IE comprises at least one of: UE Security Capabilities, the User Subscription Identifier (e.g., SUCI and/or 5G-GUTI), the KSI, the Authentication parameter, and an ABBA parameter having a special value. In some embodiments, the Reroute NAS message comprises Reroute Security Information, the Reroute Security information comprising at least one of: the received authentication parameter, an ABBA parameter having a special value (i.e., slice isolation specific value), and Security Algorithm identities used for Reroute NAS integrity and ciphering protection.

In some embodiments, the processor controls the network interface to send a UE authentication request message to the CSEAF during an initial UE registration procedure and receiving a UE authentication response message from the CSEAF (alternatively, receiving via an SEAF) in response to the UE authentication request message. In such embodiments, the UE authentication request message includes a User Subscription Identifier (e.g., SUCI and/or SUPI) and SNN and the UE authentication response message includes: an authentication result, an ABBA parameter having a special value, a KSI, and a first key (e.g., Kseaf and/or Kamf).

The processor stores the authentication result, the ABBA parameter having the special value, the KSI and the first key to local memory. In certain embodiments, the first key comprises a SEAF key (i.e., Kseaf). In such embodiments, the Kseaf is sent in response to the initial AMF having a co-located SEAF. In certain embodiments, the first key comprises an AMF key (i.e., Kamf). In such embodiments, the Kamf is sent in response to the initial AMF not having a co-located SEAF.

In some embodiments, the processor controls the network interface to send a NAS Security mode command message to the UE and receiving a NAS Security mode complete message. Here, the NAS Security mode command message includes the ABBA parameter having the special value. In such embodiments, the processor verifies the NAS Security mode complete message using a NAS security context and locally stores the ABBA parameter having the special value in response to successful verification of the NAS Security mode complete message.

Disclosed herein is a second method for security context handling during AMF reallocation, according to embodiments of the disclosure. The second method may be performed by an initial AMF that is co-located with a SEAF, such as the AMF 131, the Initial AMF 301, and/or the network apparatus 700, described above. The second method includes sending a Security Context request message (e.g., Nnf_AMFRealloc_Security Context Request, where 'nf' in 'Nnf' may be replaced with the name of the common NF (e.g., AUSF, NSSF, NRF, CSEAF, SEMF, SECF, etc.)) to a common NF during a UE Registration procedure. Note that the Security Context request message may be triggered in response to the initial AMF determining to perform AMF reallocation and reroute via RAN. Here, the Security Context request message includes at least one of the following: Target AMF Information (e.g., AMF ID, AMF NSI ID and/or AMF-Set-ID), a User Subscription Identifier (e.g., SUCI, SUPI, and/or 5G-GUTI), and a KSI (e.g., ngKSI).

The second method includes receiving a Security Context response message (e.g., Nnf_AMFRealloc_Security Context Response, where 'nf' in 'Nnf' may be replaced with the name of the common NF (e.g., AUSF, NSSF, NRF, CSEAF, SEMF, SECF, etc.)) from the common NF, where the Security Context response message contains an authentication parameter (e.g., NAS_Sec_ID). The second method also includes sending a Reroute NAS message with NAS protection (e.g., with integrity and ciphering protection) to a RAN node in response to determining to perform AMF reallocation and reroute via RAN. Here, the Reroute NAS message contains at least one cleartext IE (e.g., ngKSI, SUCI/5G-GUTI, Reroute Security Information, ABBA parameter, and/or NAS Security Algorithms).

In some embodiments, the Security Context request message further contains a Reroute Security Required Indication, and the Security Context response message further contains a Reroute Security Context in response to the Security Context request message containing the Reroute Security Required Indication. In some embodiments, the Reroute Security Context contains at least an integrity key (i.e., Knasint) for Reroute NAS integrity and an encryption key (i.e., Knasenc') for Reroute NAS ciphering. In certain embodiments, the Reroute NAS message contains a protected NAS container that is protected using the Reroute Security Context.

In certain embodiments, the second method includes comprising determining to include the protected NAS container in the Reroute NAS message in response to the initial AMF having one of: a complete initial UE message and NAS security information. Here, the protected NAS container may include at least one of: the User Subscriber Identifier (e.g., SUPI), the complete UE initial message, the NAS security information, and Reroute Security Information. In certain embodiments, the Security Context request message contains the Reroute Security Required Indication in response to the initial AMF having received a complete initial UE message.

In some embodiments, the at least one cleartext IE comprises at least one of: UE Security Capabilities, the User Subscription Identifier (e.g., SUCI and/or 5G-GUTI), the KSI, the Authentication parameter, and an ABBA parameter having a special value. In some embodiments, the Reroute NAS message comprises Reroute Security Information, the Reroute Security information comprising at least one of: the received authentication parameter, an ABBA parameter having a special value (i.e., slice isolation specific value), and Security Algorithm identities used for Reroute NAS integrity and ciphering protection.

In some embodiments, the second method includes sending a UE authentication request message to the CSEAF during an initial UE registration procedure and receiving a UE authentication response message from the CSEAF (alternatively, receiving via an SEAF) in response to the UE authentication request message. In such embodiments, the UE authentication request message includes a User Subscription Identifier (e.g., SUCI and/or SUPI) and SNN and the UE authentication response message includes: an authentication result, an ABBA parameter having a special value, a KSI, and a first key (e.g., Kseaf and/or Kamf).

The second method further includes storing to local memory the authentication result, the ABBA parameter having the special value, the KSI and the first key. In certain embodiments, the first key comprises a SEAF key (i.e., Kseaf). In such embodiments, the Kseaf is sent in response to the initial AMF having a co-located SEAF. In certain embodiments, the first key comprises an AMF key (i.e., Kamf). In such embodiments, the Kamf is sent in response to the initial AMF not having a co-located SEAF.

In some embodiments, the second method includes sending a NAS Security mode command message to the UE and receiving a NAS Security mode complete message. Here, the NAS Security mode command message includes the ABBA parameter having the special value. In such embodiments, the second method further includes verifying the NAS Security mode complete message using a NAS security context and locally storing the ABBA parameter having the special value in response to successful verification of the NAS Security mode complete message.

Disclosed herein is a third apparatus for security context handling during AMF reallocation, according to embodiments of the disclosure. The third apparatus may be implemented by a Target AMF co-located with a SEAF, such as the AMF 131, the Target AMF/SEAF 401, and/or the network apparatus 700, described above. The third apparatus includes a processor and a network interface that receives a Reroute NAS message for a UE (e.g., containing a Registration Request), where an N14 interface with an initial AMF is not supported. Here, the Reroute NAS message contains at least one of: a User Subscription Identifier (e.g., SUCI and/or 5G-GUTI) of a UE, a KSI (e.g., ngKSI) and an authentication parameter. The processor determines to fetch a Reroute NAS Security Context based on the authentication parameter. Via the network interface, the processor sends a Key Request (e.g., NAS Key Request) message to a common NF. Here, the Key Request message includes at least one of: the authentication parameter, AMF information (e.g., AMF ID, AMF NSI ID, AMF Set ID) and the KSI.

The network interface receives a Key Response message from the common NF to the Target AMF, where the Key Response message includes at least one of: a SUPI related to the received User Subscription Identifier, a N-NSCI, an ABBA parameter having a special value, a new security context (e.g., Kseaf and/or Kamf), and a Reroute NAS Security Context containing at least an integrity key for Reroute NAS integrity verification and an encryption key for Reroute NAS de-ciphering. Here, the new security context is derived from a primary UE security context (e.g., including keys Kcseaf, Kseaf, and/or Kausf).

In some embodiments, the processor sends a NAS Security mode command message to the UE via the network interface and receives a NAS Security mode complete message from the UE. Here, the NAS Security mode command message includes at least one of the following: the N-NSCI, the ABBA parameter having the special value, and the KSI, and where the NAS Security mode complete message includes a N-NSCI Acknowledgement. In such embodiments, the processor verifies the received NAS Security mode complete message by using NAS integrity and ciphering keys derived from a new Kamf which is associated to the N-NSCI in response to receiving N-NSCI Acknowledgement. Moreover, in response to successful verification of the NAS Security mode complete message, the processor stores to local memory at least the KSI and the ABBA parameter having the special value.

In certain embodiments, the ABBA parameter in the NAS Security mode command message has a value specific to network slicing, slice isolation, and AMF reallocation. Here, the ABBA parameter having the specific value enables the slice security feature in the UE for new SEAF key (i.e., Kseaf) derivation and corresponding AMF key (i.e., Kamf) derivation. In certain embodiments, the N-NSCI in the NAS security mode command message indicates to the UE to derive a new NAS security context from the new Kseaf and to rekey the Kamf to align the new NAS security derived at UE with the Reroute NAS security context available in the Target AMF.

In some embodiments, the Reroute NAS message comprises at least one cleartext IE and a protected NAS container. In such embodiments, determining to fetch the Reroute NAS security context is further based on the received NAS container. In certain embodiments, the processor performs integrity verification and deciphering of the protected NAS container using the Reroute security context.

In such embodiments, the at least one cleartext IE includes at least one of: UE Security Capabilities, the User Subscription Identifier, the KSI, the Authentication parameter (e.g., NAS_Sec_ID), and the ABBA parameter having the special value. In certain embodiments, the Reroute NAS message contains Reroute Security Information, where the Reroute Security information includes at least one of: the received authentication parameter, the ABBA parameter having the special value, and Security Algorithm identities used for Reroute NAS integrity and ciphering protection.

In some embodiments, direct UE identification is required when the N14 interface is not supported. In such embodiments, the processor controls the network interface to send an Identity Request to the UE and receive an Identity Request from UE, where the Identity Request contains the SUCI belonging to the UE.

Disclosed herein is a third method for security context handling during AMF reallocation, according to embodiments of the disclosure. The third method may be performed by a Target AMF co-located with a SEAF, such as the AMF 131, the Target AMF/SEAF 401, and/or the network apparatus 700, described above. The third method includes receiving a Reroute NAS message for a UE (e.g., containing a Registration Request), the Reroute NAS message including at least one of: a Reroute Indication, a User Subscription Identifier (e.g., SUCI and/or 5G-GUTI) of a UE, a KSI (e.g., ngKSI) and an authentication parameter, where an N14 interface with an initial AMF is not supported. The third method includes determining to fetch a Reroute NAS Security Context based on the authentication parameter.

The third method includes sending a Key Request (e.g., NAS Key Request) message to a common NF and receiving a Key Response message from the common NF to the Target AMF. Here, the Key Request message includes at least one of: the authentication parameter, AMF information (e.g., AMF ID, AMF NSI ID, AMF Set ID), a Reroute Key Indicator, and the KSI. Additionally, the Key Response message includes at least one of: a SUPI related to the received User Subscription Identifier, a N-NSCI, an ABBA parameter having a special value, a new security context (e.g., Kseaf and/or Kamf), and a Reroute NAS Security Context containing at least an integrity key for Reroute NAS integrity verification and an encryption key for Reroute NAS de-ciphering, where the new security context is derived from a primary UE security context (e.g., including keys Kcseaf, Kseaf, and/or Kausf).

In some embodiments, the third method includes sending a NAS Security mode command message to the UE and receiving a NAS Security mode complete message from the UE, where the NAS Security mode command message includes at least one of the following: the N-NSCI, the ABBA parameter having the special value, and the KSI, and where the NAS Security mode complete message includes a N-NSCI Acknowledgement. In such embodiments, the third method includes verifying the received NAS Security mode complete message by using NAS integrity and ciphering keys derived from a new Kamf which is associated to the N-NSCI in response to receiving N-NSCI Acknowledgement and locally storing the KSI and the ABBA parameter having the special value, in response to successful verification of the NAS Security mode complete message.

In certain embodiments, the ABBA parameter in the NAS Security mode command message has a value specific to network slicing, slice isolation, and AMF reallocation. Here, the ABBA parameter having the specific value enables the slice security feature in the UE for new SEAF key (i.e., Kseaf) derivation and corresponding AMF key (i.e., Kamf) derivation. In certain embodiments, the N-NSCI in the NAS security mode command message indicates to the UE to derive a new NAS security context from the new Kseaf and to rekey the Kamf to align the new NAS security derived at UE with the Reroute NAS security context available in the Target AMF.

In some embodiments, the Reroute NAS message comprises at least one cleartext IE and a protected NAS container. In such embodiments, determining to fetch the Reroute NAS security context is further based on the received NAS container. In certain embodiments, the third method includes performing integrity verification and deciphering of the protected NAS container using the Reroute security context.

In such embodiments, the at least one cleartext IE includes at least one of: UE Security Capabilities, the User Subscription Identifier, the KSI, the Authentication parameter (e.g., NAS_Sec_ID), and the ABBA parameter having the special value. In certain embodiments, the Reroute NAS message contains Reroute Security Information, where the Reroute Security information includes at least one of: the received authentication parameter, the ABBA parameter having the special value, and Security Algorithm identities used for Reroute NAS integrity and ciphering protection.

In some embodiments, direct UE identification is required when the N14 interface is not supported. In such embodiments, the third method further includes sending an Identity Request to the UE and receiving an Identity Request from UE, where the Identity Request contains a SUCI belonging to the UE.

Disclosed herein is a fourth apparatus for security context handling during AMF reallocation, according to embodiments of the disclosure. The fourth apparatus may be implemented by an Authentication Server Function in a mobile communication network, such as AUSF 136, the AUSF 305, and/or the network apparatus 700, described above. The fourth apparatus includes a processor and a network interface that receives a UE Authenticate Request message from a common network function (e.g., the CSEAF/SEMF/SECF) during a UE registration procedure. Here, the UE authenticate Request message includes a User Subscriber Identifier (e.g., SUCI and/or SUPI) and an SNN. The processor derives a primary UE security context (e.g., containing Kcseaf and/or Kseaf) in response to successful UE authentication, where the primary UE security context includes a first key that is derived from an AUSF Key (i.e., Kausf). Via the network interface, the processor sends a UE authenticate Response message to the common network function, where the UE authenticate Response message includes an authentication result, a SUPI, and the primary UE security context.

In certain embodiments, deriving the primary UE security context further includes deriving a SEAF key (i.e., Kseaf) in response to the mobile communication network deploying a SEAF co-located with an AMF. In such embodiments, the processor derives the Kseaf by using the Kcseaf as an input key and using at least one of the following input values: FC value, SNN, a length of the SNN, Usage Type parameter, and a length of the Usage Type parameter, where the Usage Type parameter contains the string 'Slice/Service Information/AMF Set/default.'

In some embodiments, the first key is a CSEAF key (i.e., Kcseaf). In such embodiments, the processor derives the Kcseaf by using the Kausf as an input key and using at least one of the following input values: FC, SNN, length of SNN, SUPI, length of SUPI, a Usage Type parameter, and a length of Usage Type parameter, where the Usage Type parameter contains the string 'Serving Network Master Key.' In certain embodiments, the primary UE security context sent in the UE authenticate Response message contains only the Kcseaf in response to the processor determining to send a single primary security context. In certain embodiments, the primary UE security context sent in the UE authenticate Response message contains only the Kcseaf in response to the fourth apparatus being configured to send only one serving network key.

In some embodiments, the first key is a SEAF key (i.e., Kseaf). In such embodiments, the processor derives the Kseaf by using the Kcseaf as an input key and using at least one of the following input values: FC value, SNN, a length of the SNN, Usage Type parameter, and a length of the Usage Type parameter, where the Usage Type parameter contains the string 'Slice/Service Information/AMF Set/default.' In certain embodiments, the primary UE security context sent in the UE authenticate Response message comprises only the Kseaf in response to the processor determining to send a single primary security context. In certain embodiments, the primary UE security context sent in the UE authenticate Response message comprises only the Kseaf in response to the fourth apparatus being configured to send only one serving network key.

Disclosed herein is a fourth method for security context handling during AMF reallocation, according to embodiments of the disclosure. The fourth method may be performed by an Authentication Server Function ("AUSF") in a mobile communication network, such as the AUSF 136, the AUSF 305, and/or the network apparatus 700, described above. The fourth method includes receiving a UE Authenticate Request message from a common network function (e.g., the CSEAF/SEMF/SECF) during a UE registration procedure. Here, the UE authenticate Request message includes a User Subscriber Identifier (e.g., SUCI and/or SUPI) and an SNN. The fourth method includes deriving a primary UE security context (e.g., containing Kcseaf and/or Kseaf) in response to successful UE authentication, where the primary UE security context includes a first key that is derived from an AUSF Key (i.e., Kausf). The fourth method includes sending a UE authenticate Response message to the common network function, where the UE authenticate Response message includes an authentication result, a Subscriber Permanent Identity ("SUPI"), and the primary UE security context.

In certain embodiments, deriving the primary UE security context further includes deriving a SEAF key (i.e., Kseaf) in response to the mobile communication network deploying a SEAF co-located with an AMF. In such embodiments, deriving the Kseaf comprises using the Kcseaf as an input key and using at least one of the following input values: FC value, SNN, a length of the SNN, Usage Type parameter, and a length of the Usage Type parameter, where the Usage Type parameter comprises the string 'Slice/Service Information/AMF Set/default.'

In some embodiments, the first key is a CSEAF key (i.e., Kcseaf). In such embodiments, deriving the Kcseaf includes using the Kausf as an input key and using at least one of the following input values: FC, SNN, length of SNN, SUPI, length of SUPI, a Usage Type parameter, and a length of Usage Type parameter, where the Usage Type parameter contains the string 'Serving Network Master Key.'

In certain embodiments, the primary UE security context sent in the UE authenticate Response message comprises only the Kcseaf in response to the AUSF determining to send a single primary security context. In certain embodiments, the primary UE security context sent in the UE authenticate Response message comprises only the Kcseaf in response to the AUSF being configured to send only one serving network key.

In some embodiments, the first key is a SEAF key (i.e., Kseaf). In such embodiments, deriving the Kseaf includes using the Kcseaf as an input key and using at least one of the following input values: FC value, SNN, a length of the SNN, Usage Type parameter, and a length of the Usage Type parameter, where the Usage Type parameter contains the string 'Slice/Service Information/AMF Set/default.' In certain embodiments, the primary UE security context sent in the UE authenticate Response message comprises only the Kseaf in response to the AUSF determining to send a single primary security context. In certain embodiments, the primary UE security context sent in the UE authenticate Response message comprises only the Kseaf in response to the AUSF being configured to send only one serving network key.

Disclosed herein is a fifth apparatus for security context handling during AMF reallocation, according to embodiments of the disclosure. The fifth apparatus may be implemented by a user equipment device in a mobile communication network, such as the remote unit 105, the UE 205, and/or the user equipment apparatus 600, described above.

The fifth apparatus includes a processor and a transceiver that receives a NAS Security mode command message from a Target AMF, where the NAS Security mode command message includes at least one of: a N-NSCI, an ABBA parameter having a special value, and a KSI. The processor derives a new SEAF key (i.e., Kseaf) from a primary UE security context (e.g., from Kausf) in response to the ABBA parameter having the special value and further in response to the N-NSCI. The processor derives a new AMF key (i.e., Kamf) from the primary UE security context (e.g., from the new Kseaf) in response to the N-NSCI.

The processor verifies the NAS Security mode command message using a NAS integrity key derived from the new Kamf and using a NAS ciphering key derived from the new Kamf. The processor stores the Kamf along with the N-NSCI, the KSI and the ABBA parameter having the special value to local memory (i.e., to volatile or non-volatile memory and/or in USIM/ME) in response to successful verification of the NAS Security mode command message. Via the transceiver, the processor sends the NAS Security mode complete message to the Target AMF, where the NAS Security mode complete message includes an N-NSCI Acknowledgement.

In some embodiments, the transceiver receives a NAS Security mode command message from an initial AMF, where the NAS Security mode command message includes the ABBA parameter having the special value and the KSI. In such embodiments, the processor verifies the NAS Security mode command message using a NAS security context and stores the ABBA parameter having the special value and the KSI to local memory in response to successful verification of the NAS Security mode command message. Here, the processor also generates the primary UE security context (e.g., generating a new Kseaf from Kausf) in response to receiving the ABBA parameter having the special value.

In some embodiments, the primary UE security context includes an AUSF key (i.e., Kausf). In such embodiments, the processor derives the new Kseaf by using the Kausf as an input key and using at least one of the following input values: the ABBA parameter having the special value, length of the ABBA parameter, Usage Type='Slice/Service Information/AMF Set/default,' and Length of Usage Type. In certain embodiments, the processor derives the new Kamf from the primary UE security context by using the derived new Kseaf as an input key and using at least one of the following input values: SUPI, length of SUPI, the ABBA parameter having the special value, length of the ABBA parameter, the N-NSCI, and Length of N-NSCI. Here, the NAS Security mode command message containing the ABBA parameter having the special values enables the slice security feature in the UE for Kseaf and/or Kamf derivation.

In some embodiments, the primary UE security context includes CSEAF key (i.e., Kcseaf). In such embodiments, the processor derives the Kcseaf by using the Kausf as an input key and using at least one of the following input values: FC, SNN, length of SNN, the ABBA parameter having the special value, length of the ABBA parameter, SUPI, length of SUPI, Usage Type='Serving Network Master Key.' and Length of Usage Type. In certain embodiments, the processor derives the new Kamf from the primary UE security context by using the Kcseaf as an input key and using at least one of the following input values: SUPI, length of SUPI, special ABBA parameter, length of special ABBA parameter, N-NSCI, and Length of N-NSCI.

Disclosed herein is a fifth method for security context handling during AMF reallocation, according to embodiments of the disclosure. The fifth method may be performed by a user equipment device in a mobile communication network, such as the remote unit 105, the UE 205, and/or the user equipment apparatus 600, described above. The fifth method includes receiving a NAS Security mode command message from a Target AMF. Here, the NAS Security mode command message includes at least one of: a N-NSCI, an ABBA parameter having a special value, and a KSI. The fifth method includes deriving a new SEAF key (i.e., Kseaf) from a primary UE security context (e.g., from Kausf) in response to the ABBA parameter having the special value and further in response to the N-NSCI. The fifth method includes deriving a new AMF key (i.e., Kamf) from the primary UE security context (e.g., from the new Kseaf) in response to the N-NSCI.

The fifth method includes verifying the NAS Security mode command message using a NAS integrity key derived from the new Kamf and using a NAS ciphering key derived from the new Kamf. The fifth method includes storing the Kamf along with the N-NSCI, the KSI and the ABBA parameter having the special value to local memory (i.e., to volatile or non-volatile memory and/or in USIM/ME) in response to successful verification of the NAS Security mode command message. The fifth method includes sending the NAS Security mode complete message to the Target AMF, where the NAS Security mode complete message includes an N-NSCI Acknowledgement.

In some embodiments, the fifth method includes receiving a NAS Security mode command message from an initial AMF, where the NAS Security mode command message includes the ABBA parameter having the special value and the KSI. In such embodiments, the fifth method further includes verifying the NAS Security mode command message using a NAS security context and storing the ABBA parameter having the special value and the KSI to local memory in response to successful verification of the NAS Security mode command message. Here, the fifth method also includes generating the primary UE security context (e.g., generating a new Kseaf from Kausf) in response to receiving the ABBA parameter having the special value.

In some embodiments, the primary UE security context includes an AUSF key (i.e., Kausf). In such embodiments, deriving the new Kseaf includes using the Kausf as an input key and using at least one of the following input values: the ABBA parameter having the special value, length of the ABBA parameter, Usage Type='Slice/Service Information/AMF Set/default,' and Length of Usage Type. In certain embodiments, deriving the new Kamf from the primary UE security context includes using the derived new Kseaf as an input key and using at least one of the following input values: SUPI, length of SUPI, the ABBA parameter having the special value, length of the ABBA parameter, the N-NSCI, and Length of N-NSCI. Here, the NAS Security mode command message containing the ABBA parameter having the special values enables the slice security feature in the UE for Kseaf and/or Kamf derivation.

In some embodiments, the primary UE security context includes CSEAF key (i.e., Kcseaf). In such embodiments, deriving the Kcseaf includes using the Kausf as an input key and using at least one of the following input values: FC, SNN, length of SNN, the ABBA parameter having the special value, length of the ABBA parameter, SUPI, length of SUPI, Usage Type='Serving Network Master Key,' and Length of Usage Type. In certain embodiments, deriving the new Kamf from the primary UE security context includes using the Kcseaf as an input key and using at least one of the following input values: SUPI, length of SUPI, special ABBA parameter, length of special ABBA parameter, N-NSCI, and Length of N-NSCI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network function apparatus in a core network, the network function apparatus comprising:
   a processor; and
   a memory coupled to the processor, the processor configured to cause the network function apparatus to:
   derive a Reroute Security Context comprising at least an integrity key for Reroute Non-Access Stratum ("NAS") integrity protection and an encryption key for Reroute NAS ciphering protection;
   derive a first authentication parameter for authenticating a Target Access and Mobility Management Function ("AMF"), the Target AMF having a co-located Security Anchor Function ("SEAF"), the first authentication parameter comprising an identifier of the Reroute Security Context;
   receive a Key Request message from the SEAF co-located with the Target AMF following an AMF reallocation during a User Equipment ("UE") Registration procedure, wherein the Key Request message includes: a UE identifier, Target AMF information, a second authentication parameter, or a Reroute Key indication, or a combination thereof;
   verify the Key Request message by determining whether the second authentication parameter matches the identifier of the first authentication parameter;
   derive a new security context for the Target AMF in response to the verified Key Request message, wherein the new security context is derived from a primary UE security context; and
   send a Key Response message to the Target AMF, wherein the Key Response message includes: the new security context, a Subscription Permanent Identifier ("SUPI") associated with the UE identifier, an Anti-Bidding down Between Architectures ("ABBA") parameter having a special value, or a New NAS Security Context Indicator ("N-NSCI"), or a combination thereof.

2. The network function apparatus of claim 1, wherein the Key Request message further comprises a Reroute Key Indication, and wherein the Key Response message further comprises the Reroute Security Context.

3. The network function apparatus of claim 1, wherein the processor is further configured to cause the network function apparatus to:
   receive a Security Context request message from an initial AMF, the initial AMF having a co-located SEAF ("initial AMF/SEAF") during the UE Registration procedure and prior to receiving the Key Request message, wherein the Security Context request message includes: Target AMF Information, a User Subscription Identifier(s), a Reroute Security Required Indication, or a first Key Set Identifier ("KSI"), or a combination thereof;
   generate the Reroute Security Context in response to the Reroute Security Required indication being a positive indication, wherein the integrity key is derived from a first key associated with the network function apparatus, and wherein the encryption key is derived from the first key;
   derive the first authentication parameter using: the integrity key, the encryption key, the User Subscription Identifier, the Target AMF Information, or the first Key, or a combination thereof;
   store the derived Reroute Security context, the User Subscription Identifier(s), and/or the first authentication parameter in local memory; and
   send a Security Context response message to the initial AMF, the Security Context response message comprising the first authentication parameter, wherein the Security Context response message further comprises the Reroute Security Context in response to the Reroute Security Required indication being a positive indication.

4. The network function apparatus of claim 3,
   wherein the User Subscription Identifier comprises: a Subscription Concealed Identifier ("SUCI"), a 5G Globally Unique Temporary UE Identity ("5G-GUTI"), or the SUPI, or a combination thereof;
   wherein the processor is further configured to cause the network function apparatus to:
   determine whether the SUCI, the 5G-GUTI, or the SUPI is stored in local memory;
   consider a UE corresponding to the SUCI, the 5G-GUTI, or the SUPI as authenticated in response to determining that the SUCI, the 5G-GUTI, or SUPI is stored in the local memory; and
   retrieve a valid Primary UE security context in response to determining that the SUCI, the 5G-GUTI, or the SUPI is stored in the local memory, the retrieve the valid Primary UE security context related to: the first authentication parameter, the User Subscription Identifier, or the KSI in the first Security Context request message, or a combination thereof.

5. The network function apparatus of claim 4,
   wherein the ABBA parameter having the special value indicates a network slice-specific feature where a new Security Anchor Function ("SEAF") key ("Kseaf") and an AMF key ("Kamf") are to be derived from the Primary UE security context to adhere to slice security and isolation requirements between the initial AMF and the target AMF,
   wherein, to derive the new Kseaf, the processor is configured to cause the network function apparatus to use the Kausf as an input key and to use at least one of the following input values: the ABBA parameter having the special value, a length of the ABBA parameter having the special value, a Usage Type set to 'Slice/Service Information/AMF Set/default', or a length of the Usage Type, or a combination thereof,
   wherein, to derive the new Kamf from the primary UE security context, the processor is configured to cause the network function apparatus to use the derived new Kseaf as an input key and to use at least one of the following input values: the SUPI, a length of SUPI, the ABBA parameter having the special value, a length of the ABBA parameter having the special value, the N-NSCI, or a length of N-NSCI, or a combination thereof.

6. The network function apparatus of claim 1,
   wherein the Primary UE security context is not specific to any network slice, wherein the processor is configured to cause the network function apparatus to control the provisioning of UE security context transfer to other network functions based on the network slice security, service and isolation requirements and local policy configured by the operator.

7. The network function apparatus of claim 1, wherein the network function apparatus comprises:
an Authentication Server Function ("AUSF"),
a Network Slice Selection Function ("NSSF"),
a Network Repository Function ("NRF"),
a Common Security Anchor Function ("CSEAF"),
a Security Management Function ("SEMF"), or
a Security Control Function ("SECF"),
or a combination thereof.

8. An initial Access and Mobility Management Function ("AMF") apparatus that is co-located with a Security Anchor Function ("SEAF"), the initial AMF apparatus comprising:
a processor; and
a memory coupled to the processor, the processor configured to cause the initial AMF apparatus to:
send a Security Context request message to a common network function ("NF") during a User Equipment ("UE") Registration procedure, wherein the Security Context request message includes at least one of the following: Target AMF Information, a User Subscription Identifier, and a Key Set Identifier ("KSI");
receive a Security Context response message from the common NF, wherein the Security Context response message comprises a Reroute Security Context and an authentication parameter, the authentication parameter comprising an identifier of the Reroute Security Context; and
send a Reroute Non-Access Stratum ("NAS") message with NAS protection to a Radio Access Network ("RAN") node in response to determining to perform AMF reallocation and reroute via RAN, wherein the Reroute NAS message comprises at least one cleartext Information Element ("IE") and the identifier of the reroute security context.

9. The initial AMF apparatus of claim 8, wherein the Security Context request message further comprises a Reroute Security Required Indication.

10. The initial AMF apparatus of claim 9, wherein the Reroute Security Context comprises at least an integrity key for Reroute NAS integrity and an encryption key for Reroute NAS ciphering, wherein the Reroute NAS message comprises a protected NAS container that is protected using the Reroute Security Context.

11. The initial AMF apparatus of claim 10,
wherein the processor is configured to include the protected NAS container in the Reroute NAS message in response to the initial AMF apparatus having one of: a complete initial UE message or NAS security information,
wherein the protected NAS container comprises: the User Subscriber Identifier, the complete UE initial message, the NAS security information, or Reroute Security Information, or a combination thereof.

12. The initial AMF apparatus of claim 8, wherein the at least one cleartext IE comprises:
UE Security Capabilities,
the User Subscription Identifier,
the KSI,
the Authentication parameter, or
an Anti-Bidding down Between Architectures ("ABBA") parameter having a special value,
or a combination thereof.

13. The initial AMF apparatus of claim 8, wherein the Reroute NAS message comprises Reroute Security Information, the Reroute Security information comprising:
the received authentication parameter,
an Anti-Bidding down Between Architectures ("ABBA") parameter having a special value, or
Security Algorithm identities used for Reroute NAS integrity and ciphering protection,
or a combination thereof.

14. A Target Access and Mobility Management Function ("AMF") apparatus that is co-located with a Security Anchor Function ("SEAF"), the Target AMF apparatus comprising:
a processor; and
a memory coupled to the processor, the processor configured to cause the apparatus to:
receive a Reroute Non-Access Stratum ("NAS") message for a UE, the Reroute NAS message comprising: a User Subscription Identifier of a User Equipment ("UE"), a Key Set Identifier ("KSI"), or an authentication parameter, the authentication parameter comprising an identifier of a Reroute Non-Access Stratum ("NAS") Security Context, or a combination thereof, wherein an N14 interface with an initial AMF is not supported;
determine to fetch a Reroute NAS Security Context based on the Reroute NAS Security Context corresponding to the identifier;
send a Key Request message to a common Network function ("NF"), wherein the Key Request message includes: the identifier, AMF information, a Reroute Key Indicator, or the KSI, or a combination thereof; and
receive a Key Response message from the common NF to the Target AMF apparatus, wherein the Key Response message includes: a Subscription Permanent Identifier ("SUPI") related to the received User Subscription Identifier, a New NAS Security Context Indicator ("N-NSCI"), an Anti-Bidding down Between Architectures ("ABBA") parameter having a special value, a new security context, or a Reroute NAS Security Context containing at least an integrity key for Reroute NAS integrity verification and an encryption key for Reroute NAS de-ciphering, or a combination thereof,
wherein the new security context is derived from a primary UE security context.

15. The Target AMF apparatus of claim 14, wherein the processor is configured to cause the Target AMF apparatus to:
send a NAS Security mode command message to the UE, wherein the NAS Security mode command message includes: the N-NSCI, the ABBA parameter having the special value, or the KSI, or a combination thereof; and
receive a NAS Security mode complete message from the UE, wherein the NAS Security mode complete message includes a N-NSCI Acknowledgement,
verify the received NAS Security mode complete message by using NAS integrity and ciphering keys derived from a new AMF key ("Kamf") which is associated to the N-NSCI in response to receiving N-NSCI Acknowledgement; and
store the KSI and the ABBA parameter to local memory, in response to successful verification of the NAS Security mode complete message.

16. The Target AMF apparatus of claim 15, wherein the ABBA parameter in the NAS Security mode command message enables the slice security feature in the UE for new SEAF key ("Kseaf") derivation and corresponding Kamf derivation.

17. The Target AMF apparatus of claim 16, wherein the N-NSCI in the NAS security mode command message indicates to the UE to derive a new NAS security context from the new Kseaf and to rekey the Kamf to align the new NAS security derived at UE with the Reroute NAS security context available in the Target AMF.

18. The Target AMF apparatus of claim 14,
wherein the Reroute NAS message comprises at least one cleartext Information Element ("IE") and a protected NAS container,
wherein determining to fetch the Reroute NAS security context is further based on the received NAS container,
wherein the Reroute NAS message comprises at least one cleartext Information Element ("IE"),
wherein the at least one cleartext IE comprises: UE Security Capabilities, the User Subscription Identifier, the KSI, the Authentication parameter, or the ABBA parameter having the special value, or a combination thereof,
wherein the Reroute NAS message comprises Reroute Security Information, the Reroute Security information comprising: the received authentication parameter, the ABBA parameter having the special value, or Security Algorithm identities used for Reroute NAS integrity and ciphering protection, or a combination thereof.

* * * * *